Aug. 14, 1945. R. M. THOMPSON 2,382,453
CONTINUOUS PRESSURE SEPARATING DEVICE
Filed March 29, 1939 11 Sheets-Sheet 2

INVENTOR
Robert M. Thompson
BY
ATTORNEY

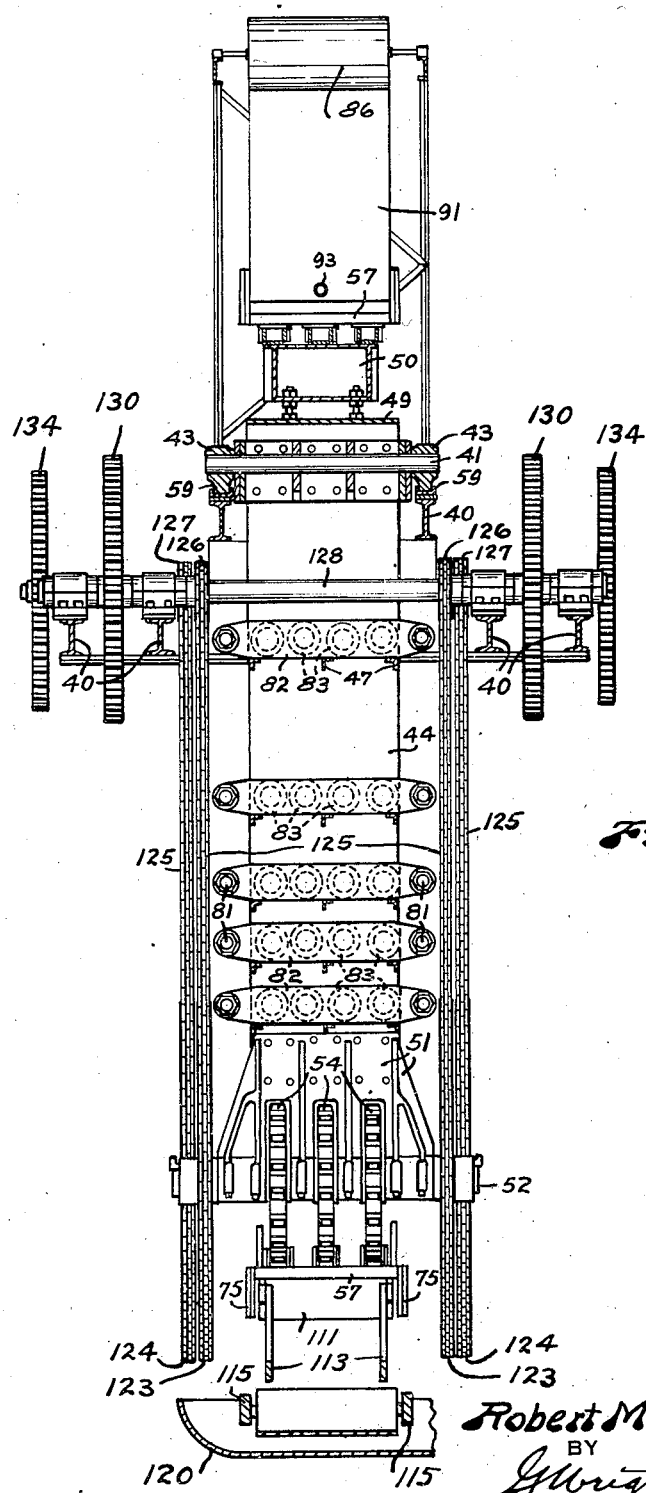

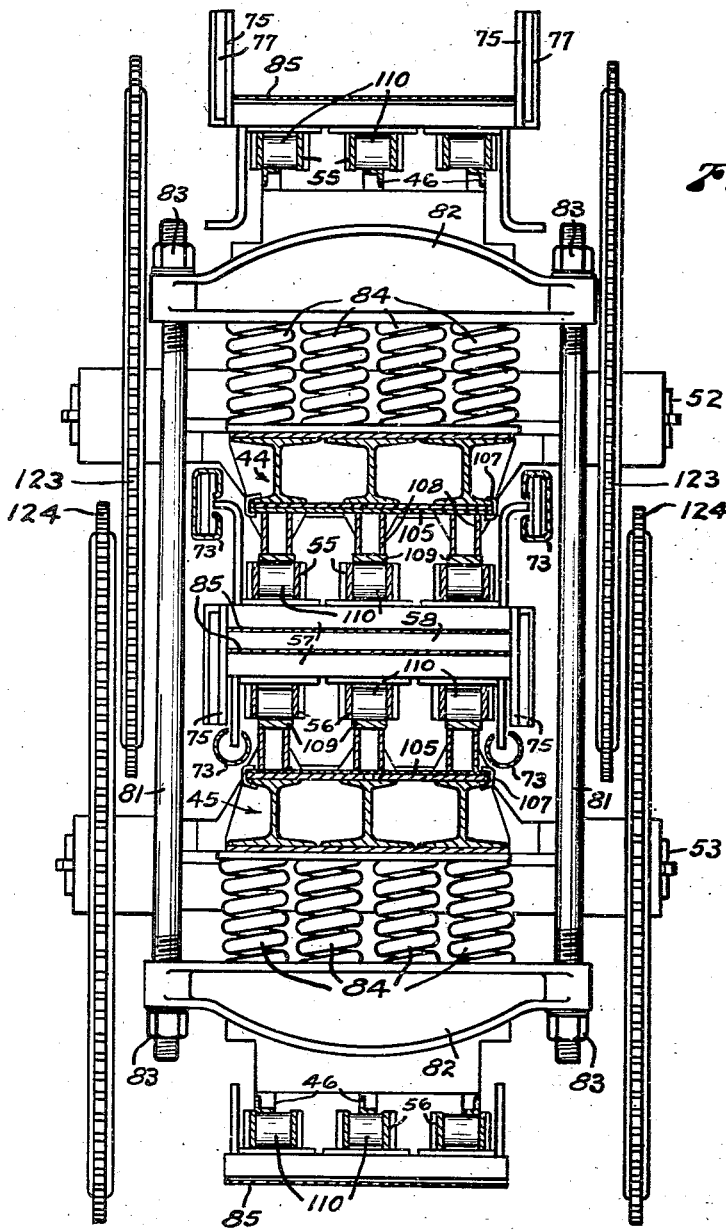

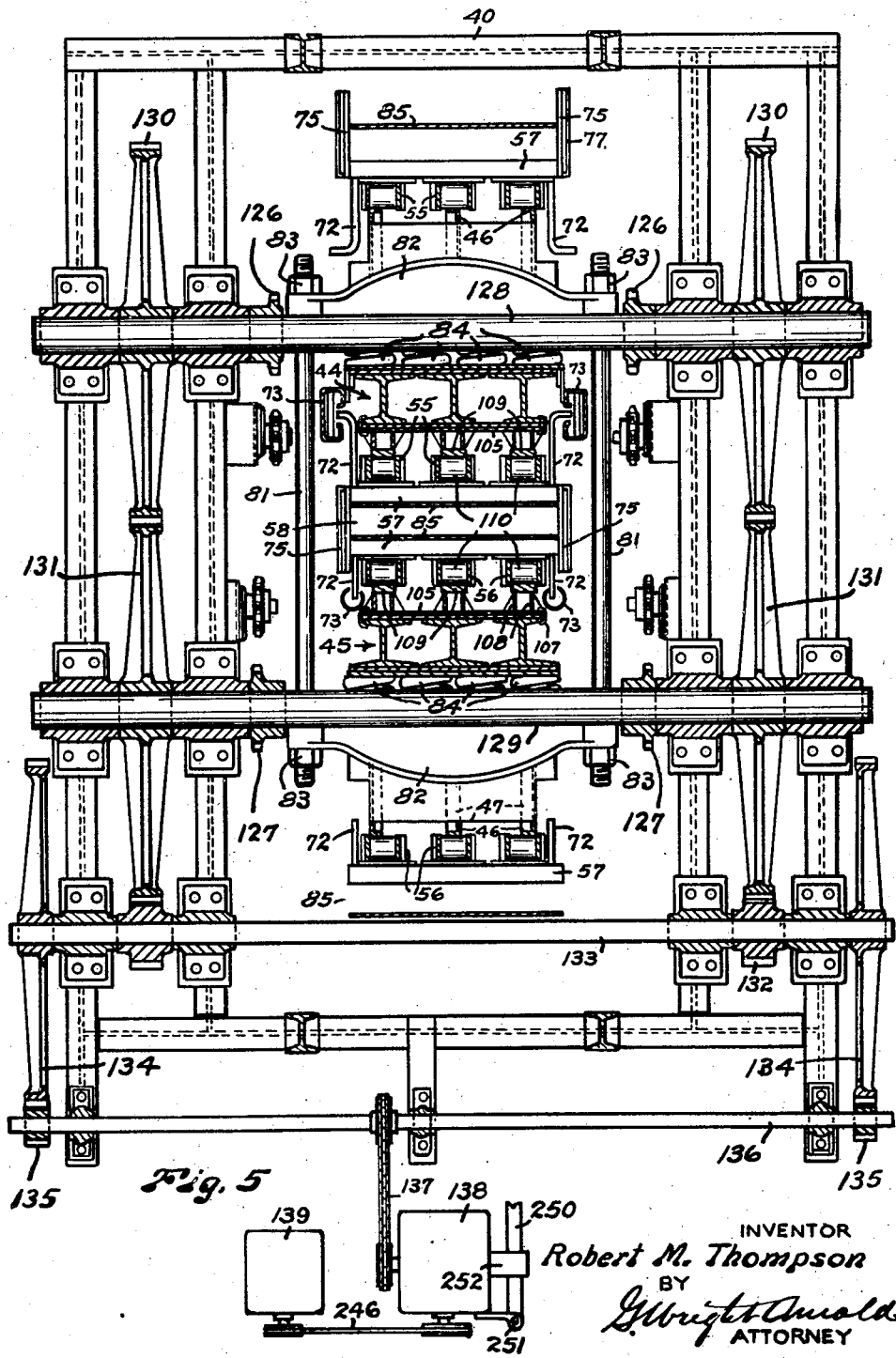

Aug. 14. 1945. R. M. THOMPSON 2,382,453
CONTINUOUS PRESSURE SEPARATING DEVICE
Filed March 29, 1939 11 Sheets-Sheet 6
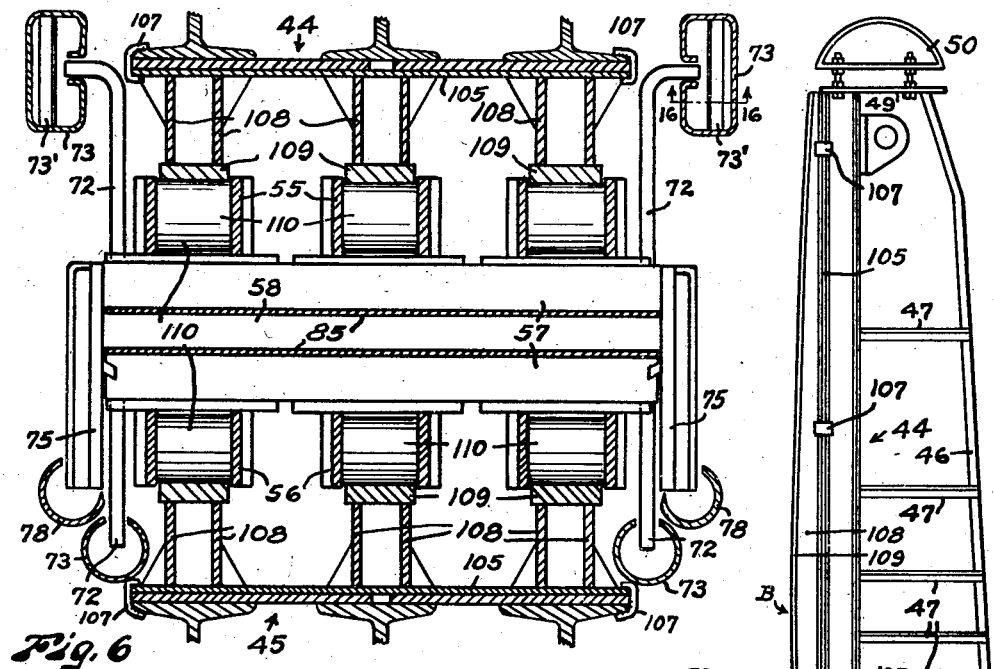
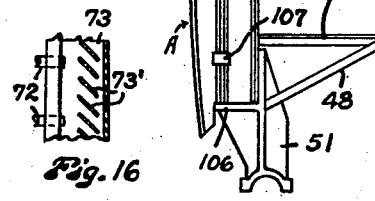
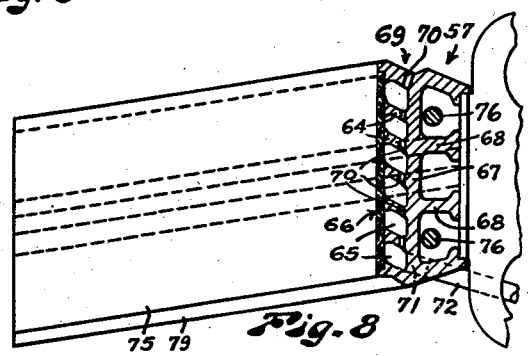
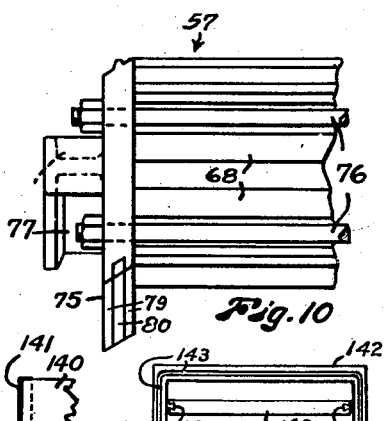
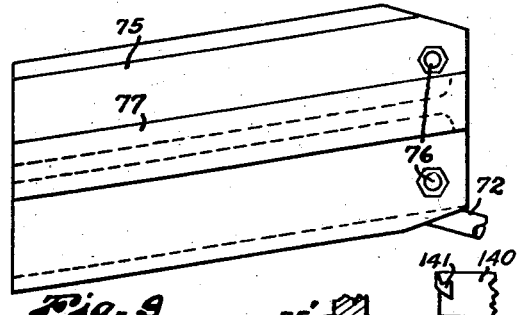
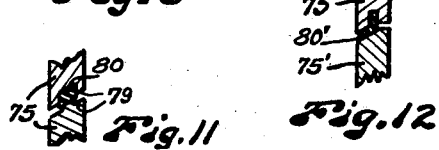
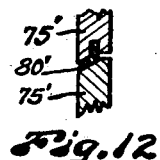
INVENTOR
Robert M. Thompson
BY
ATTORNEY Aug. 14, 1945.   R. M. THOMPSON   2,382,453
CONTINUOUS PRESSURE SEPARATING DEVICE
Filed March 29, 1939   11 Sheets-Sheet 7
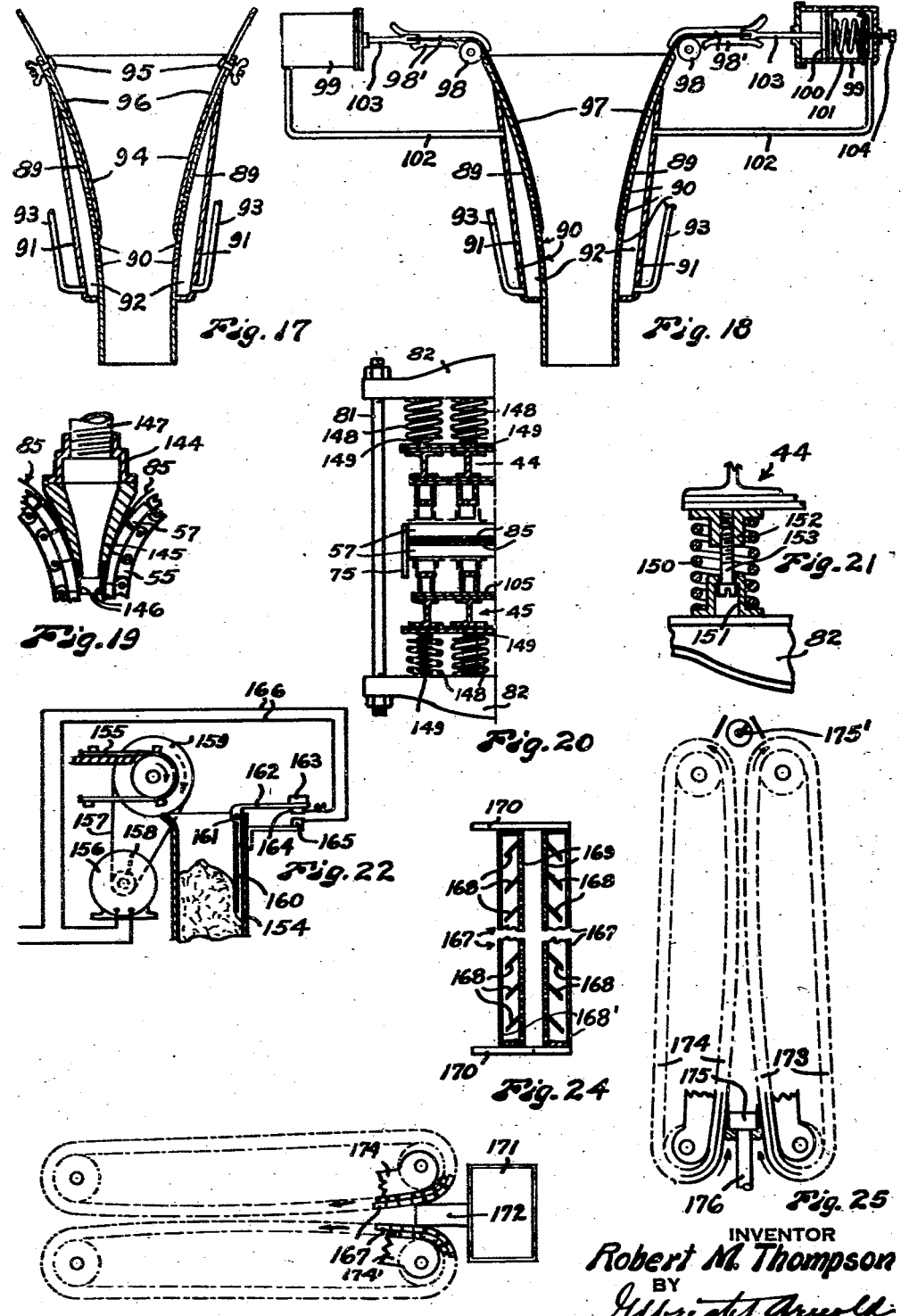
INVENTOR
Robert M. Thompson
BY
ATTORNEY Aug. 14, 1945.   R. M. THOMPSON   2,382,453
CONTINUOUS PRESSURE SEPARATING DEVICE
Filed March 29, 1939   11 Sheets-Sheet 8

INVENTOR.
Robert M. Thompson
BY
ATTORNEY

Aug. 14, 1945.    R. M. THOMPSON    2,382,453
CONTINUOUS PRESSURE SEPARATING DEVICE
Filed March 29, 1939    11 Sheets-Sheet 9
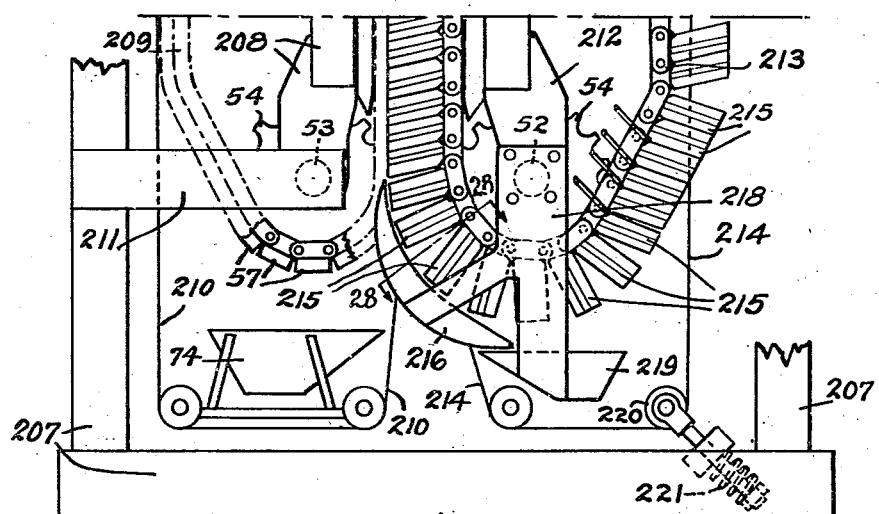
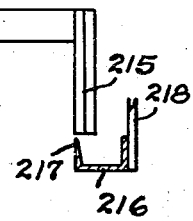
Fig. 27
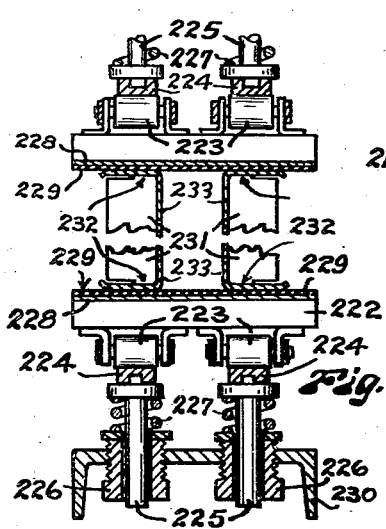
Fig. 29
Fig. 28
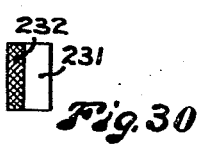
Fig. 30
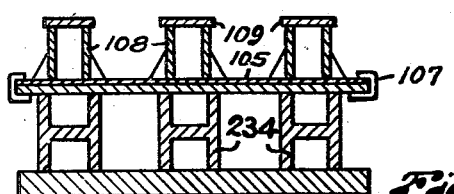
Fig. 31
INVENTOR.
Robert M. Thompson
BY
ATTORNEY Aug. 14, 1945.  R. M. THOMPSON  2,382,453
CONTINUOUS PRESSURE SEPARATING DEVICE
Filed March 29, 1939  11 Sheets-Sheet 10
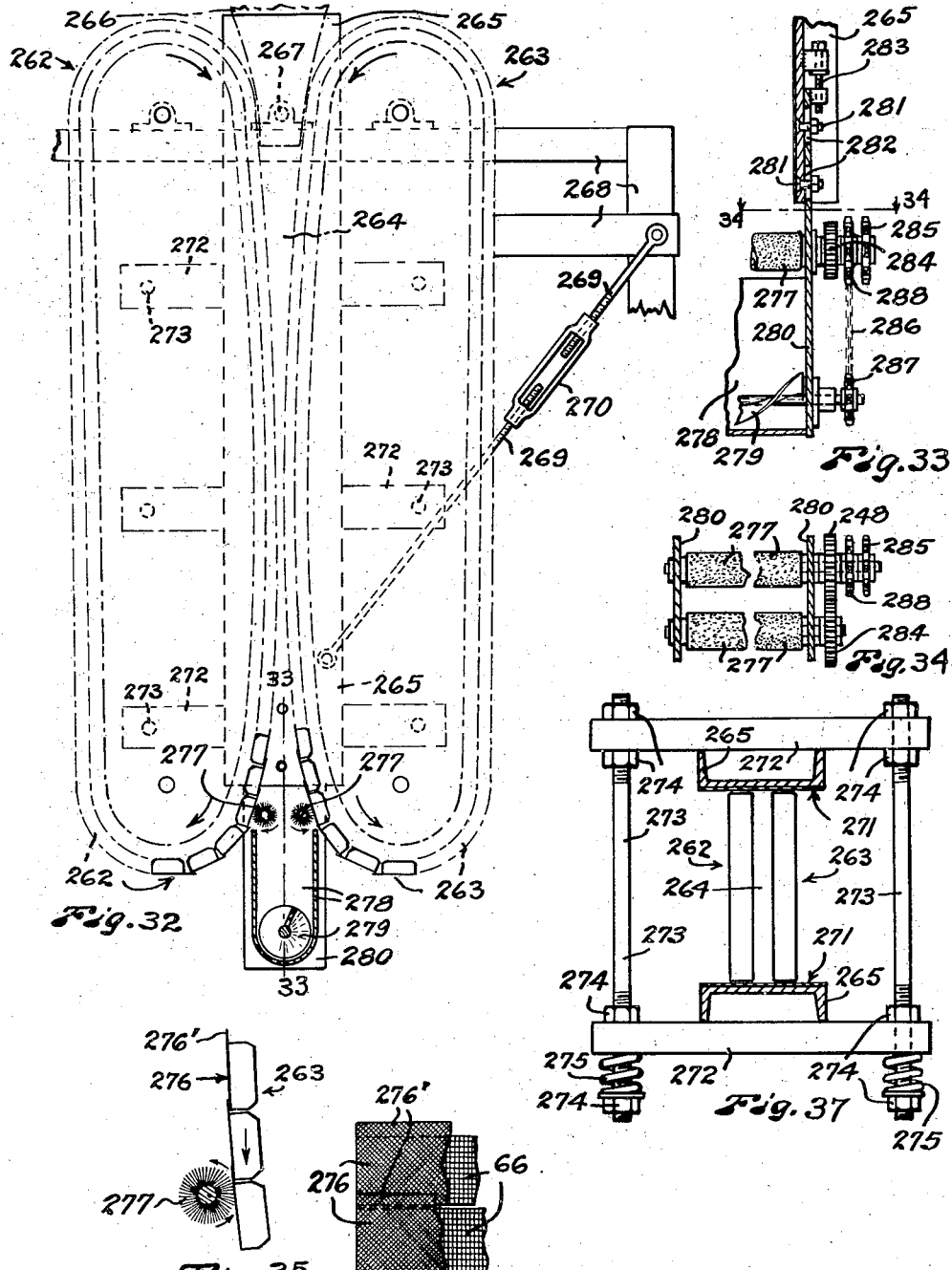
INVENTOR.
Robert M. Thompson
BY
G. Wright Arnold
ATTORNEY Aug. 14, 1945.　　　R. M. THOMPSON　　　2,382,453
CONTINUOUS PRESSURE SEPARATING DEVICE
Filed March 29, 1939　　　11 Sheets-Sheet 11

INVENTOR
Robert M. Thompson
BY
　　　　ATTORNEY

Patented Aug. 14, 1945

2,382,453

UNITED STATES PATENT OFFICE 2,382,453

CONTINUOUS PRESSURE SEPARATING DEVICE

Robert M. Thompson, Seattle, Wash.

Application March 29, 1939, Serial No. 264,809

16 Claims. (Cl. 210—197)

My invention relates to the art of devices designed to separate fluids or liquids from other fluids or liquids of greater fluidity and fluids or liquids from solids.

More particularly, my invention relates to a combined press and filter press or to a press designed for continuous operation which is characterized by the development of extremely high pressures and practical and efficient operation. Particularly does my invention relate to simplifying and reducing the cost of the filtration or filtration step in the industrial arts, which step at present constitutes one of the expensive operations in manufacturing.

It is common practice in the art of filtration to refer to devices designed for the separation of materials by the application of force or pressure to the materials from without, as "presses"; while devices designed for the separation of materials by having the force or pressure transmitted through the materials themselves as "filter presses." "Filter presses" are usually used where the amount of solids to be separated is but a small proportion of the total mobile mass composed of said solids and liquids in which said solids are disposed and hence the said materials are pumped into the filter press. "Presses" on the other hand, are used where the proportion of solid matter is much greater in relation to that of the liquid composing said materials to be filtered. The distinction between the two devices will develop clearly in the following paragraphs.

By rendering the filtering continuous, my device herein disclosed provides for utilizing the filter press principle with materials in which the solids are the predominant percentage of the material being treated. This is just the reverse of the common practice. Heretofore, the devices in common use for materials having only a small percentage of liquids, have been the press type rather than the filter press type. By providing for relatively excessively high pressures and fluid tight chambers and continuous discharge of cake in a filter press type of device, the machine embodying my invention herein set forth, has solved one of the difficult steps in manufacturing processes.

In the industrial arts filtration is very often a costly item in the manufacturing process. This is due in part to the intermittent character of the operation of the filter devices and to the large amount of manual attention which is incident thereto. Moreover, in the filtering process there are points at which the expressed liquids are more clear than at other points. The clearer liquids are usually obtained during the latter stages of the separating process due to the fact that these liquids pass through the filtering medium after a deposit of the retained solids on the filtering medium has accumulated, which retained solids usually form an important part of the filtering medium. The early liquids expressed before the deposit of said solids in the form of a filter on the filter cloth or medium may be cloudy. By separately drawing off the cloudy portion of the expressed liquid during the early stages of the filtration process, a minimum quantity of the cloudy filtrate is retained with the clear filtrate.

Objection obtains to the devices as heretofore designed in the leakage that takes place by the joints formed between the stationary parts and moving parts of the device. Also serious objection obtains to the friction developed between said parts. This friction results in excessive wearing away of the filter cloth as well as other parts. Furthermore, serious objection obtains in that the great pressures developed are difficult of control and when developed locally or are unevenly distributed result in breaking the machine.

In connection with the filtration part of the manufacturing process, it is frequently desirable to have a device which may be employed both as a press and as a filter press. The filter devices as heretofore in common use are not capable of this dual use. This involves the installation of both devices which involves great expense as well as the loss of important floor space.

The general objects of my present invention are to overcome the objections to prior devices of the nature hereinabove pointed out and to generally improve and increase the efficiency of continuous presses and filter presses, as well as to provide new means and modes of operation with new results at less cost.

Another object of this invention is to provide a simple and efficient driving means for a press or filter press of this type which is capable of withstanding the heavy strains to which driving means of this nature is subjected, whereby relatively light construction is possible where strong driving forces are involved.

Another object is to provide track members which are substantially circular segments for supporting slat belts of a combined press and filter press of this type in the pressure zone, whereby the gap between adjacent slats due to track curvature is kept constant while the slats are under pressure, whereby if a filter belt is employed the same is protected against injury, and if no filter belt is employed the slats are maintained in filtering position, so that no increase in the width of the gap between the slats is permitted until said slats have passed the point of maximum pressure and until the point is reached where the pressure has been relieved.

Another object is to provide a machine of the character herein-described having quickly and easily replaceable curved tracks on which slat belts run, whereby the compression ratio of the machine may be quickly changed by substituting a different track, and at the same time the point of maximum compression in the machine may be maintained fixed.

Another object is to provide a continuous pressure separating device having readily adjustable automatic safety devices for preventing the slat belts from coming entirely together and injuring the filter belts in the event there is not enough material between the said belts to hold them apart.

Another object is to provide automatic means for controlling the feed of material into the hopper of this machine, a construction made possible by reason of the fact that substantially all pressures developed in the machine are counterbalanced within the machine.

Another object is to provide a continuous pressure separating device of this type in which the external frame structure is reduced to a minimum and the machine is adapted to be suspended from an overhead support, a construction made possible by reason of the fact that substantially all pressures developed in the machine are counterbalanced within the machine.

Another object is to provide a continuous pressure separating device in which the slat belts pass over guide members at the top of the machine instead of passing over sheaves or wheels, thus making it possible to give the slat belts any desired curvature at the top of the machine, making it unnecessary to provide room for the operation of sprocket wheels or the like at this location, and providing a more simple and more inexpensive construction.

Another object is to provide a continuous pressure separating device having continuously moving slat belts and having a feed hopper positioned above the slat belts and having filter belts which move with the slat belts and which travel down through the hopper over perforated walls and help to promote the feeding through the machine of some materials which contain a large percentage of liquid, said hopper being provided with vacuum means for drawing off a large percentage of liquid before the material passes into the press, thereby facilitating the feeding of material through the press and being further provided with means for varying the degree of the vacuum action exerted.

Another object of this invention is to provide simple and efficient means for moving the filter belt away from the slat faces at the discharge portion of the machine, thereby freeing both the filter belt and the cake of solid matter from between slat wings provided on the ends of the slats.

Another object is to provide slat belts having end closure wings on the ends thereof and having efficient packing means between the wings to prevent leakage and further having efficient means to pick up liquid which finds its way out to the ends of the slat wings.

Another object is to provide an efficient arrangement of duplex springs for use in this machine, said spring arrangement comprising strong heavy springs positioned to resist movement away from each other of the pendent frames carrying the slat belts and filter belts when a normal amount of solid matter is present between the slat and filter belts and lighter and weaker springs supporting the pendent frames where the filter and slat belts are in close proximity to each other or in contact with each other and have substantially no solid matter between them, said heavier springs, being inoperative when the filter and slat belts are operating substantially in contact with each other thereby avoiding damage to the filter belts such as will result if they are held in contact with each other by the pressure of the heavy springs while the machine is operating with substantially no solid matter between the filter belts.

Another object of the invention is to provide a continuous pressure separating device having two frames, at least one of which is movable, said frames carrying slat belts and filter belts and being connected with each other by floating tie rods and being provided with resilient supporting means, such as hydraulic-pneumatic supporting means or spring supporting means positioned at one end only of the floating tie rods, the said resilient supporting means at one end of the tie rods providing sufficient resiliency for the two frames.

Another object is to provide a continuous pressure separating device which is provided with vacuum means for picking up solid material on the filter belts and withdrawing a portion of the liquid before said filter belts, with their adhering material, pass into the pressure area of the machine.

Since for some uses the price for a large size machine designed to exert high pressures is prohibitive and unnecessary for removing a large percentage of the liquid, an object of the present invention is to provide a continuous pressure separating device comprised of a plurality of separating devices, through all of which the same filter belts pass, the final separating device being of relatively small size but of heavy construction designed to exert high pressures, while the preceding separating devices are of relatively light and economical construction.

Great difficulty has been experienced in maintaining the dry cake at the discharge end of the machine free from re-absorption of filtrate. One of the objects of the present invention is to provide a cake removing means which will overcome this difficulty, said means comprising a receptacle, the walls of which extend upwardly between the moving belts rotating cake removing means operatively disposed with respect to the upper edges of said walls of said receptacle, and bearing upon or in close proximity to the moving belt means and a discharge conveyor in the bottom portion of said receptacle.

A most persistent difficulty in separating the liquids from the solids is often present in devices as heretofore designed, due to the fact that a portion of the expressed filtrate will contact the discharging cake and be reabsorbed. An object of the present invention is to overcome this difficulty and in doing this I provide a device of a character capable of discharging the cake upwardly or if the machine is placed on its side, to discharge the cake horizontally on its edge, thereby making use at all times of the force of gravity to maintain the filtrate apart from the cake and prevent its re-entry into the cake. Another object of this invention is to provide a continuous pressure separating device of the character herein described, which is capable of discharging the cake upwardly or of discharging the cake also horizontally on its edge.

Another object of the invention is to provide a continuous pressure separating device of the character herein described, employing moving slat belts formed of slats that have knurled end portions positioned to make contact with filter belts which pass around the ends of said slats and are supported against resilient surfaces on impervious moving side belts, the knurled surfaces on the ends of the slats preventing slippage of the filter belts on the slats as said slats approach the center plane of the filter chamber in moving towards the discharge portion of the filter chamber, said filter belts sliding on said resilient surfaces with the minimum wear on the filter belts.

Another object of the invention is to provide a structure in which side wings on the slats of the slat belts are eliminated and pivotally mounted side plates are provided at the sides of the machine for completing the closure of the filter chamber and to provide a yielding tie rod construction to maintain the side plates in proper operative relation to the edges of the slat belts, said tie rod construction preventing binding of the plates against the ends of the slats and counterbalancing the forces developed in the filter chamber and exerted against the side plates.

The above mentioned general objects of my invention, together with others inherent in the same are attained by the mechanism illustrated in the following drawings, the same being preferred exemplary forms of embodiment of my invention, throughout which drawings like reference numerals indicate like parts:

Fig. 3 is a side elevation, with parts in section and parts omitted, looking at the machine in substantially the direction indicated by broken line 3—3 of Fig. 1.

Figure 1:
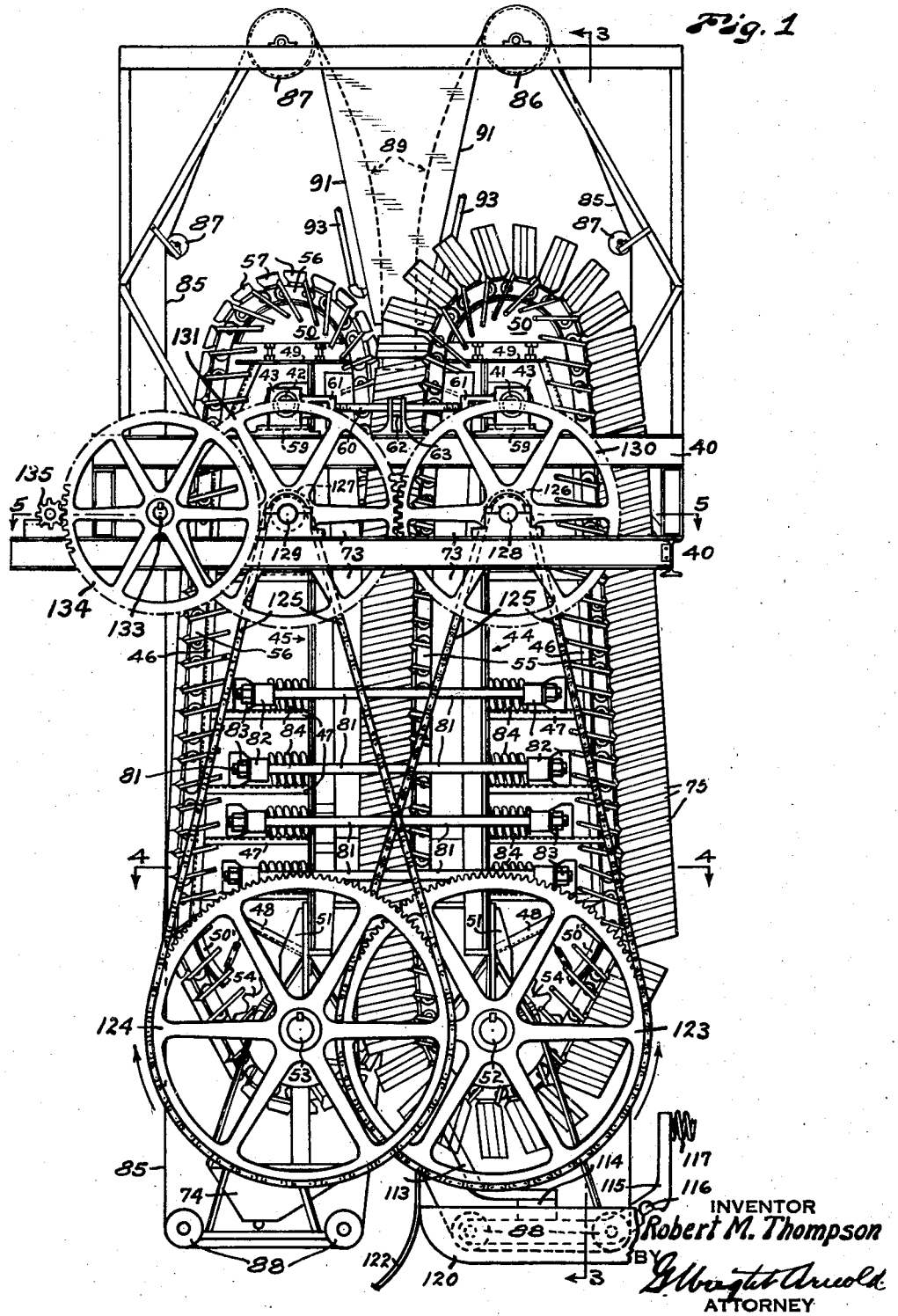
Fig. 1 is a side elevation of a continuous pressure separating device constructed in accordance with this invention.

Figs. 4 and 5 are views in cross section, substantially on broken lines 4—4 and 5—5 respectively of Fig. 1, parts being shown in plan.

Fig. 6 is a sectional view, with parts in plan, on a larger scale than Figs. 4 and 5 and showing the slat belts and filter belts and supporting means for the same.

Fig. 7 is a detached elevation of one of the pendent frame members with the track upon which the slat belts run attached thereto.

Fig. 8 is a view in cross section of one of the slats used in making up the slat belt, showing in elevation a fragment of a link belt to which said slat is connected and showing in elevation a wing member that is secured to the slat.

Fig. 9 is a view in outside elevation of one of the slat wings adapted to be connected with the end portions of some of the slats.

Fig. 10 is a fragmentary view in elevation showing the back portion of one of the slats and the end of a slat wing which is secured to said slat.

Fig. 11 is a fragmentary sectional view illustrating a liquid seal means employed in the construction of the slat wings.

Fig. 12 is a fragmentary sectional view illustrating a modified form of liquid seal means used in connection with the slat wings.

Fig. 13 is a fragmentary edge view of a slat showing a sealing means therefor.

Fig. 14 is a side elevation of the device shown in Fig. 13.

Fig. 15 is a plan view of a modified form of slat having integral side wing members and having a packing strip extending longitudinally of one edge thereof.

Fig. 16 is a sectional view on broken line 16—16 of Fig. 6.

Fig. 17 is a detached view in vertical section of a vacuum type feed hopper used in connection with this machine.

Figure 18 is a detached view in vertical section of a modified form of said vacuum type feed hopper.

Figure 19 is a fragmentary view in vertical section showing the upper portion of a continuous pressure separating device provided with a plug-like closing member positioned between two moving belts and adapted to have material introduced therethrough.

Figure 20 is a fragmentary detail illustrating a double spring means adapted to be used in connection with this invention.

Figure 21 is another fragmentary view illustrating a form of spring means in which devices are provided for limiting the expansion of the spring.

Figure 22 is a somewhat diagrammatic view partly in elevation and partly in section of one type of feed control means adapted for use in connection with a continuous pressure separating device of this type.

Figure 23 is a somewhat diagrammatic plan view of a continuous pressure separating device of this type showing the same operatively disposed in a substantially horizontal position so as to discharge a cake on its edge.

Figure 24 is a fragmentary sectional view showing two opposed slats of slat belts that are adapted for use in the machine shown in Figure 23.

Figure 25 is a somewhat diagrammatic side elevation of a continuous pressure separating device similar to the machine shown in Figures 1 to 10 but positioned so that the intake of material is at the lower end portion and the discharge of solid matter at the upper end portion of the machine.

Figure 26:
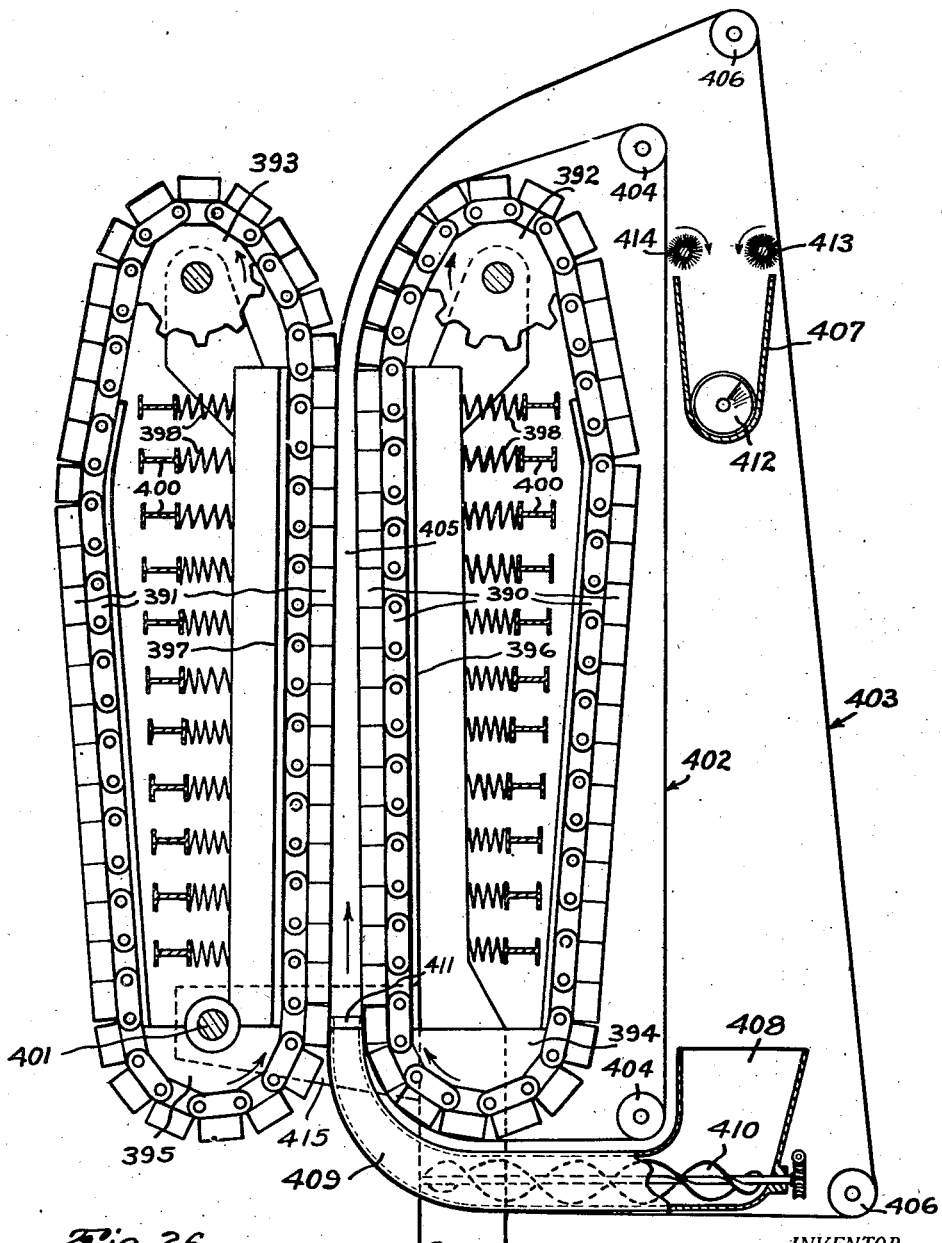

Figure 26 is a view partly in section and partly in elevation of another type of this machine adapted to discharge solid material in an upward direction.

Figure 27 is a fragmentary side elevation of the lower end portion of a combined press and filter press constructed in accordance with this invention, showing means for taking care of liquid which discharges from the ends of slat wings and showing a resiliently supported filter belt on a movable frame member.

Figure 28 is a detached view partly in section and partly in plan, taken substantially on broken line 28—28 of Figure 27 and showing the means for taking care of the liquid which discharges from the ends of the slat wings.

Figure 29 is a fragmentary sectional view showing slat belt and side belt means of modified form.

Figure 30 is an end view of a slat of the form shown in Figure 29.

Figure 31 is a cross sectional view of a modified form of slat supporting frame member in which H plates are used to provide great strength.

Figure 32 is a somewhat diagrammatic view, with parts in section, showing a modified form of the invention in which the side wings on the slats are dispensed with and stationary side plates positioned adjacent the ends of the slats of the slot belts and showing slats with foraminous overlapping filtering faces and rotary brush means for brushing off these faces at the lower end of the machine.

Figure 33 is a fragmentary vertical section, on a larger scale than Figure 32, taken substantially on broken line 33—33 of Figure 32 and showing adjustable supporting means and driving means for the rotary brushes.

Figure 34 is a view partly in plan and partly in section on line 34—34 of Figure 33.

Figure 35 is a fragmentary edge view showing one of the rotary brushes in operative engagement with some of the slats.

Figure 36 is an elevation of fragments of two of the slats, showing the overlapping foraminous filter faces of said slats.

Figure 37 is a sectional view, with parts omitted, showing the side plates used in Figure 32 and showing the means for supporting the same.

Figure 38:
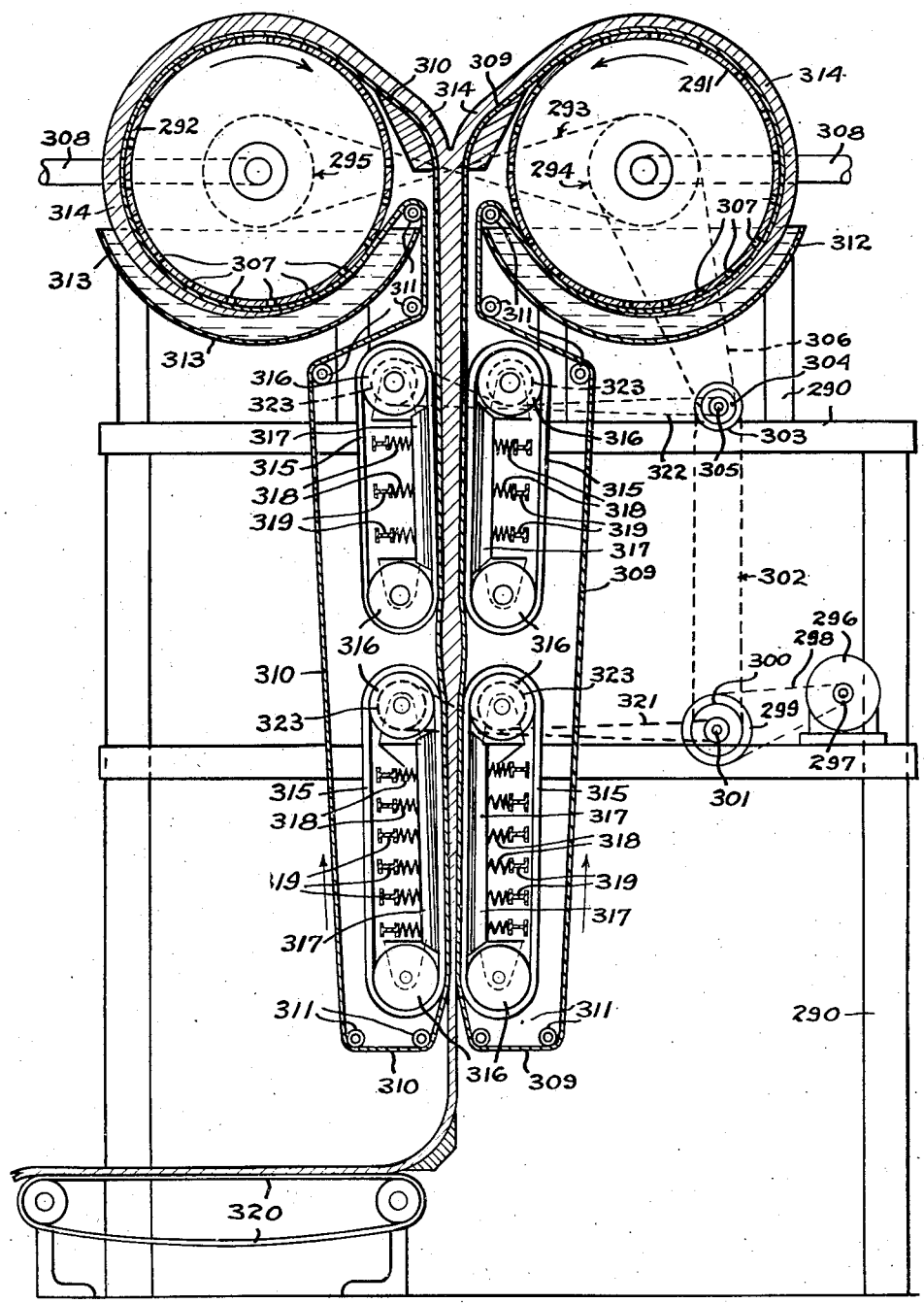

Fig. 38 is a somewhat diagrammatic view partly in vertical section of a combined press and filter press provided with vacuum means for picking up material on the filter belts before said filter belts pass into the pressure area of the machine and further showing a plurality of presses positioned so that the material passes successively through one after the other of these presses whereby the material may be subjected to successively varying degrees of pressure.

Referring to Figs. 1 to 11 inclusive, which illustrate one embodiment of this invention, 40 designates an overhead frame of any suitable construction which is supported in any desired manner. For instance, the frame 40 may be positioned on one floor of a building and the lower portion of the machine may be suspended in a room below. Two cross shafts 41 and 42 are supported in movable bearing means 43 on the frame 40. Two pendent frames 44 and 45 are suspended from the cross shafts 41 and 42 respectively. These pendent frames 44 and 45 are of strong and substantial construction, preferably being built up of I beams and plates substantially as shown in Figs. 4, 5, and 6. Each pendent frame has a lighter upright frame member 46 secured thereto by transverse bars 47 and by an inclined bar 48 at the lower end and horizontal plates 49 at the upper end. Each frame member 46 forms a track spaced outwardly from the pendent frame 44 or 45 to which it is secured for guiding one portion of a slat belt, hereinafter described. Removable track members 105, 108, 109, having faces 109 which are substantially circular segments, are secured to the inner sides of the pendent frames for slat belts to run on as hereinafter set forth.

Figure 2:
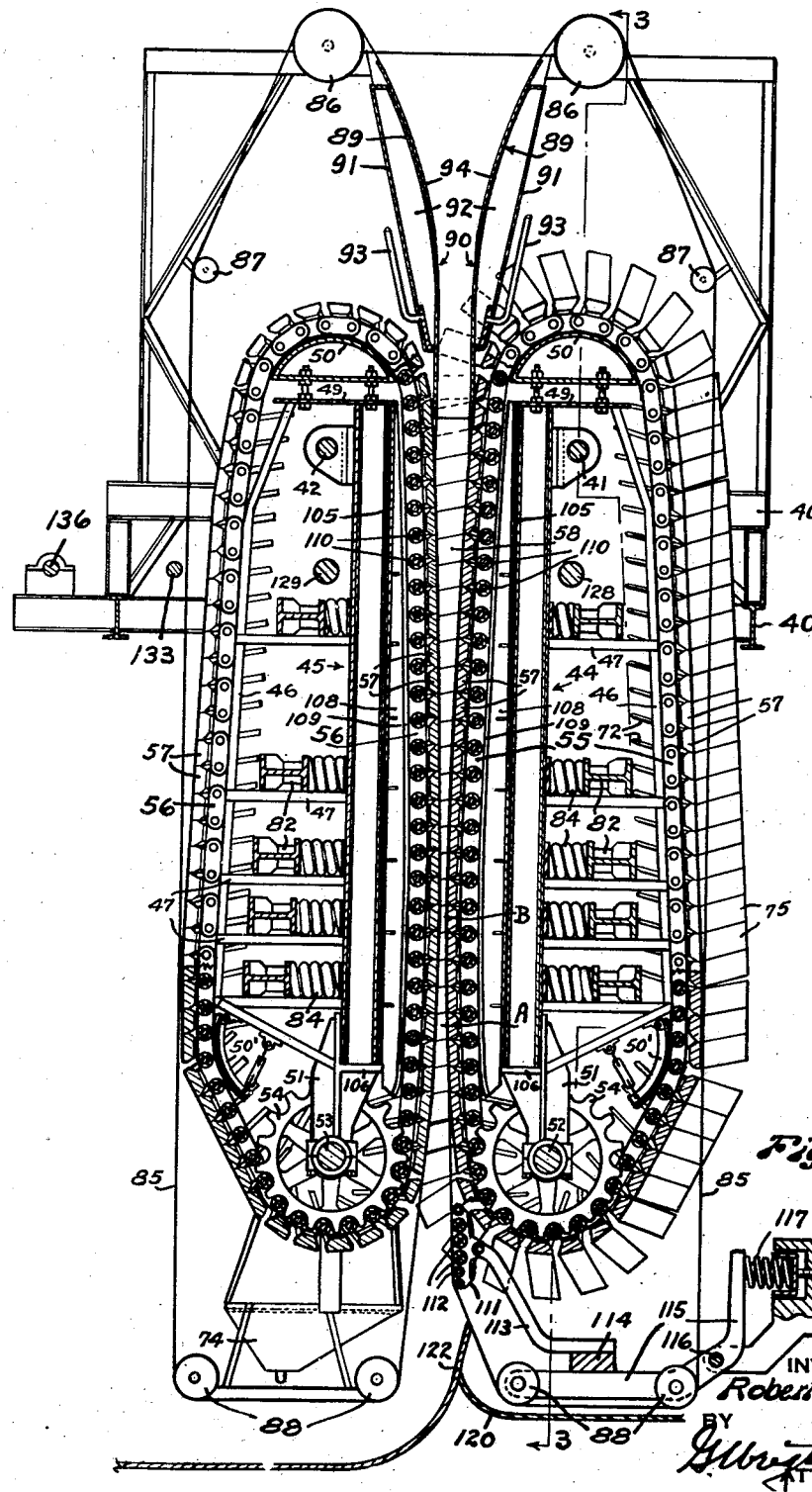
Fig. 2 is a vertical sectional view of the same.

A rounded guide track 50, see Figs. 1 and 2, is provided at the top of each pendent frame for the slat belts to move over. The rounded guide tracks 50' are secured to the plates 49. A bearing bracket 51 is secured to the lower end portion of each pendent frame 44 and 45 and extends downwardly therefrom. Two shafts 52 and 53 are journaled in the bearing brackets 51 and a plurality of sprocket wheels 54 are secured on each of the shafts, 52 and 53, see Figs. 2 and 3.

Two endless slat belts are provided in connection with the respective pendent frames 44 and 45. These slat belts comprise link belts 55 and 56 operatively mounted on the sprocket wheels 54 and on the rounded guide tracks 50. Preferably other guide tracks 50' which also serve as tighteners are provided for the link belts just below the inclined frame bars 48. Transverse slats 57 are carried by the link belts 55 and 56.

The two endless slat belts are supported on the pendent frames 44 and 45 in such a manner that they cooperate with other parts of the machine in forming a pressure or filter chamber 58 having as two of its sides the two opposed and adjacent portions of the slat belts. This pressure or filter chamber 58 is wider at the top and converges toward the lower end in such a manner that material which is introduced at the upper end portion of the chamber will be subjected to increasing pressure as it moves downwardly in this chamber 58. The opposed portions of the slat belts which form walls of the pressure chamber move downwardly in the normal operation of the machine shown in Figs. 1 to 11.

The bearing members 43 for the two shafts 41 and 42 are adjustably mounted on the frame 40 by dove tail means 59, Figs. 1 and 3 so that the two bearing members 43 may be adjusted toward and away from each other to vary the distance between the upper portions of the adjacent laps of the slat belts. The adjusting means for these bearing members 43 is in the form of an adjusting rod 60, Fig. 1, having right and left hand screw thread connection with brackets 61 on the bearing members 43. A fixed nut 62 on the adjusting rod 60 is positioned between the two spaced apart sides of a forked bracket 63 which is secured to the frame 40, see Fig. 1. When a wrench is placed on the nut 62 and the adjusting rod 60 is turned, the bearing members 43 will be moved toward and away from each other. The bearing members 43 are in duplicate on opposite sides of the machine, see Fig. 3, and the adjusting means therefor is likewise in duplicate so that the shafts 41 and 42 may be equally adjusted at the two end portions thereof and parallelism of said shafts maintained.

The slats 57 are preferably of metal of substantially the cross sectional shape shown in Fig. 8. These slats are provided on their front sides with longitudinally extending spaced apart ribs 64 forming between them channels 65 which extend longitudinally of the slats. The ribs 64 are inclined downwardly from front to rear so that liquid contacting said ribs will immediately flow away from the face of the slat. The uppermost forward portions of the inclined ribs 64 have substantially knife edges positioned in contact with a perforated or porous or mesh type face 66 on the front of the slat so that liquid entering through the slat face 66 will be directed away from the slat face 66 by these knife edge portions and will collect in the channels 65 and quickly be removed from the slat face. The inclined ribs 64 merge with a web portion 67 which is positioned substantially in the medial plane of the slat. This web portion 67 has longitudinal ribs 68 on the rear side thereof substantially as shown. The top edge of the slat has a longitudinally extending groove 69 for the reception of liquid filtrate which finds its way between the slats and the bottom edge of the slat is shaped as shown in Fig. 8 so as to interfit this groove. Openings 70 extend from the bottom of the groove 69 to the interior of the slat and down through the ribs 64 so that liquid entering the groove 69 will find its way into the interior of the slat and all liquid entering the slat will find its way through the openings 70 to the lowermost channel or compartment 65 thereof. This liquid will be discharged from the lowermost compartment through openings 71 positioned near the ends of the slat and communicatively connected with discharge tubes 72. The discharge tubes 72 have outwardly curved end portions which are positioned within upright conduits 73, Figs. 1, 4, and 5, during the time the tubes 72 are moving downwardly through the portion of their travel in which the liquids are being expressed. The expressed liquid flows downwardly through these conduits into any suitable receiving means, e. g., the conduits 73 at the same side of the machine as receiving means 74 may drain thereinto and the conduits 73 at the same side of the machine as pan 120 may drain thereinto or the conduits 73 may drain into a common means. The upright conduits 73 preferably have inclined cross plates or louvers 73' therein positioned to direct liquid away from the tubes 72 as soon as it leaves the tubes, see Figs. 6 and 16.

For the purpose of closing the filter chamber 58 at the edges I provide relatively flat slat wings 75 which are rigidly secured by transverse tie rods 76 to the ends of the slats of one of the slat belts and extend at substantially right angles to the plane of the face of the slats and are adapted to receive therebetween the slats of the other slat belt when the slats are moving in those portions of their path of travel in which they cooperate to form the filter chamber 58. Preferably the slat wings 75 are inclined downwardly relative to the horizontal where the slats are in the position in which they cooperate in forming the filter chamber, as shown in Figs. 1, 2, 8, and 9. This will cause liquid which escapes between the slat wings to be caught in a trough 77 provided on the outer side of each slat wing and discharged from the end of the slat wing into any suitable conduit, such as the conduit 78 shown in Figs. 1 and 6. The troughs 77 also serve to reinforce and strengthen the slat wings 75. Preferably the top and bottom edges of the slat wings are inclined as shown at 79, Fig. 11, and rubber packing strip means 80 may be provided in connection with these inclined edges 79 to provide a tighter liquid seal between these inclined edges. A modified form of packing means 80' is shown in Fig. 12. In this construction of Fig. 12 the adjoining edges of wing members 75' are inclined as shown and the packing member 80' is embedded in a slot in one of the wing members and lies between the inclined portions of the two wing members where said wing members are in operative position.

In Figs. 13, 14 and 15 I show slat means of modified form. This showing discloses one type of slat 140 having a resilient packing member 141 embedded in each end thereof and another slat 142 of channel shape adapted to receive the slat 140. The slat 142 is similar to the slats of Figs. 1 to 9 which have the slat wings thereon except that the slat 142 shown in Fig. 15 is of one piece integral construction. Preferably the wing portions of the slat 142 shown in Fig. 15 are flared apart slightly toward their outer ends so that the ends of the slat 140 will seal more firmly with the wing portions of slat 142 as the slat 140 moves into the slat 142. Also preferably a rubber sealing member 143 extends completely across one edge of the slat 142, including the wings thereof, as shown in Fig. 15. One slat belt on the machine is made up of the slats 142 and the other slat belt is made up of the slats 140.

The two pendent frames 44 and 45 are connected with each other by a plurality of floatingly mounted tie rods 81 which are positioned at the sides of the frames 44 and 45, see Figs. 1, 4, and 5 and extend through the end portions of rigid cross bars 82 and have nuts 83 provided thereon. The cross bars 82 are of very strong and rigid construction and said cross bars rest on and are supported by the horizontal frame bars. A plurality of strong and heavy compression springs 84 are interposed between the cross bars 82 and the pendent frames 44 and 45. As the pressures of the material will be greatest toward the lower end portions of the pendent frames more of the tie rods and springs are provided toward said lower end portions as shown in Figs. 1 and 2. By the use of the floating tie rods the pressure of the material against the two pendent frames is counterbalanced and the necessity for heavy external frame means is done away with.

The slat belts which are carried by the two pendent frames 44 and 45 serve as supports for filter belts 85, one of which is provided in connection with each slat belt. These filter belts are herein shown as endless belts passing continuously around the slat belts and through the filter chamber 58 and over guide rollers 86 and 87 at the upper end portion of the machine and other guide rollers 88 at the lower end portion of the machine. Obviously these filter belts may be in the form of strips instead of endless belts or they may be of other forms and two or more of said filter belts or strips may be superimposed if desired. The filter belts are moved along with the slat belts in the operation of the machine and do not require any other driving means.

It has been pointed out that the tracks 105—108—109 are circular arcs throughout that portion of their length in which they carry heavy pressures. This supports the slat belts on circular arcs throughout the area where they are subjected to the heavy pressures. The filter belts are supported by the slat belts and since the curvature of the slat belts does not change in the area of heavy pressure there will be no tendency to stretch and tear the filter belts.

When the machine is to be used for extracting liquids from materials capable of being fed through the machine by the head of the material plus the action of the moving belts a convergent hopper is preferably provided at the top portion of the machine. This hopper comprises two convergent, preferably curved side walls 89, Figs. 1, 2, and 17 over which the filter belts 85 pass downwardly, as they enter the filter chamber. The curved side walls 89 of the hopper have perforations 90 therein or are of porous construction so that a suction may be exerted through said walls and through the filter belts which cover the inner surfaces of said walls to draw off a large percentage of the free liquid in the material before said liquid passes into the filter chamber proper. This greatly increases the capacity of the machine for handling some materials and makes it possible to successfully feed some materials through the machine by gravity which might otherwise have to be fed by pressure through a plug like closing member of a form hereinafter described. Wall means 91 is spaced outwardly from the inclined perforated hopper walls 89 and united therewith to form chambers 92 for the reception of liquid and within which a suction may be exerted to draw off liquid from the hopper through the filter belts. Obviously the liquid thus drawn off will have passed through the filter belts and will have been filtered thereby. Pipes 93 are connected with the lower portions of the chambers 92 and preferably extend to a suitable suction type pump, not shown, so that suction may be exerted in the chambers 92 and the liquid drawn off therefrom. Preferably adjustable non-perforated plates 94 of thin metal are provided within the convergent hopper, as best shown in Figs. 2 and 12 to cover a portion of the perforated hopper walls. The filter belts pass over these plates 94. By adjusting these plates 94 to vary the exposed perforated area of walls 89 to which the filter belts 85 are exposed it is possible to vary the location at which suction is exerted on the filter belts and to subject a greater or less area of these filter belts to suction to secure the best operating conditions for the material being handled. Bolts 95 operable in slots 96 in the plates 94 may be used to provide for the adjustment of the plates 94 as shown in Fig. 17. Adjustment of the plates 94 will vary the degree of vacuum exerted through the filter belts by varying the filter belt area subjected to the suction.

In Fig. 18 I show somewhat diagrammatically an automatic means for adjusting the position of plates 97, which corresponds in purpose and function to the plates 94, over the perforated wall 91 of a hopper. This automatic means is controlled by the suction in the chamber 92 and adjusts the plates 97 in accordance with the suction in the chamber 92. The plates 97 used in this instance are thin and flexible and capable of being readily bent and of passing around rollers 98 and through guides 98'. The automatic plate adjusting means comprises a cylinder 99 having a piston 100 therein, see Fig. 18. A compression spring 101 is provided back of the piston 100 urging the piston in one direction. A pipe 102 connects the end portion of the cylinder 99 adjacent the spring 101 with the adjacent suction chamber 92. A piston rod 103 secured to the piston 100 extends outwardly through one end of the cylinder 99 and is secured to the flexible plate 97 whereby movement of the piston 100 will be communicated to the flexible plate 97. The rollers 98 and guide means 98' serve to prevent buckling of the flexible plate 97. When there is no minus pressure in the chamber 92 the spring 101 will move the piston 100 a maximum distance to the right, Fig. 18, and cover a maximum area of the perforated wall 89. When suction is exerted in the chamber 92 it will be communicated to the cylinder 99 and will act on the piston 100 so as to offset some of the force of the spring 101 and move the piston 100 to the left from the position shown in Fig. 18, thus moving the flexible plate 97 upwardly in the hopper and uncovering a larger area of the perforated surface of wall 91 so as to tend to reduce the built up suction. Preferably means, such as a screw 104, is provided for adjusting the pressure of the spring 101 so that the device may be set to maintain different desired degrees of vacuum or suction in the chamber 92.

The track means 105, 108, 109 on the inner sides of the pendent frames 44 and 45 for the slat belts to run on is preferably removable from the pendent frames. This makes possible a quick and easy change of tracks in the machine to vary the size and shape of the compression chamber and thus vary the compression ratio, depending on the character of the material to be handled. This track means is best shown in Figs. 2, 6, and 7. It comprises a plate 105 adapted to rest against the adjacent pendent frame. The bottom edge portion of the plate rests on a stop member 106 which is rigid with the pendent frame. The edge portions of the plate 105 are slidably received within clips 107 which are secured to the pendent frame. This provides a supporting means from which the track assembly may be quickly and easily removed to permit replacement thereof by tracks of different shape. In this machine it is desirable to use tracks each having a section that is substantially a circular segment. Where curved tracks are thus used it is not possible to adjust the position of the tracks in the machine for different compression ratios without varying the location of the point of maximum compression, that is, the point at which the two tracks approach nearest to each other. It is desirable to avoid varying the location of this point of maximum compression because these machines are of heavy and expensive construction and to design a machine in which this maximum compression point could be varied would require still heavier and more expensive design. The provision of the removable track which can be quickly and easily replaced enables me to construct a machine in which the compression ratio can be changed without varying the location of the point of maximum compression, thus adapting the machine for the handling of different materials requiring different compression ratios and providing a machine of greater utility and suitable for a wider variety of uses as well as making a saving in construction costs. I have shown three sets of bars 108 and rails 109 secured to each plate 105. Each of these sets comprises two plates or bars 108, welded or otherwise secured to the plate 105 in a plane perpendicular to the plate and a track rail 109 secured to and supported by the bars 108. The link belts 55 and 56 to which the slats 57 are secured are provided with rollers 110, Figs. 2 and 6, which run on the track rails 109. Each track 109 is a substantially circular arc throughout the entire distance where the filter belts and slat belts are subjected to heavy pressure. For instance the tracks 109 of Figs. 2 and 7 would be circular arcs from their uppermost ends approximately to points A below the location B of maximum pressure where the two filter and slat belts are nearest together. The circular arcs extend far enough below the location B of maximum pressure to allow for relief of pressure and the tracks 109 may then follow more abrupt outward curves.

As the material progresses downwardly through the machine the liquid content is squeezed out through the filter belts 85, and the solid matter is compressed and forms a cake within the chamber 58 whose sides are formed by the filter belts 85 and whose ends are formed by the slat wings 75. This cake will expand somewhat after it passes the point B of maximum pressure where the filter belts come nearest together and it will have a tendency to be carried around the lower sprocket wheel 54 over which the link belt 55 passes, due to frictional engagement of the edges, of the cake with the slat wings. To overcome this tendency of the cake to be carried around by the slat wings, I provide means for holding the filter belt 85 outwardly and thus freeing the filter belt and the cake of discharging material from the slat wings 75 at the location where the link belt 55 begins to move around the sprocket wheel 54. This means comprises a shoe 111 positioned at the lower end of the machine and having a plurality of rollers 112 which engage with the inner side of the filter belt 85 and hold the same outwardly. This presses the cake of discharging material out from between the slat wings with which the edges of said cake engage and causes the cake of material to discharge in the proper way without needless strain on the filter belt. The shoe 111 is pivotally supported by bar means 113 which is secured to a bridge member 114 that extends crosswise between two lever arms 115, only one of which is shown. The lower rolls 88 around which the filter belt 85 passes are rotatably mounted in the frame formed by lever arms 115 and bridge means 114 and are free to move slightly to maintain an even tension on the filter belt. The lever arms 115 are fulcrumed on pivot means 116 and are yieldingly engaged by compression spring means 117 whereby the rollers 112 and rolls 88 yieldingly are supported against the filter belt 85.

A pan 120 for receiving liquid is provided below the rolls 88 and the conduits 73 shown in Figs. 1, 4, 5 and 6 discharge into this pan. Another pan 74 for the reception of liquid is provided below the slat belt 56. A deflector member 122 is provided for intercepting the discharging cake of solid material and directing it to one side of the machine.

The driving means for the combined link and slot belts is shown in Figs. 1, 4, and 5. This driving means is arranged to apply the driving power at the lower end of the machine to the shafts 52 and 53. The driving means is shown in duplicate on the two sides of the machine and the parts thereof, where shown, are correspondingly numbered on the two sides of the machine. Obviously the driving means will only need to be provided on one side of the machine for some classes of work. The driving means at one side of the machine comprises two sprocket wheels 123 and 124 secured on the two shafts 52 and 53, respectively and connected by link belts 125 with sprocket pinions 126 and 127 on shafts 128 and 129 respectively. The shafts 128 and 129 are respectively provided with large gearwheels 130 and 131 which mesh with each other. The gearwheel 131 meshes with a pinion 132 on a countershaft 133. The countershaft 133 has a large gearwheel 134 thereon which meshes with a pinion 135 on a driven shaft 136. The shaft 136 is driven by link belt means 137, see Fig. 5, from a variable speed gear 138, the details of which are not shown. A motor 139 drives the variable speed gear 138.

Fig. 19 shows fragments of two filter belts 85 and fragments of two slat belts composed of slats 57. These slat belts and filter belts may be identical with the slat belts and filter belts shown in Figs. 1 to 8. A plug-like closing member is operatively disposed between these slat and filter belts to facilitate the introduction of liquid under pressure between the filter belts. This plug-like closing member may be used to facilitate feeding the machine when the material has a large percentage of liquid. This plug-like closing member comprises a hollow housing portion 144 to which is secured a hollow tapered plug member 145 shaped to fit between the filter belts and having expansible means 146 on its lower end portion. The expansible means 146 is adapted to expand against the filter belts like a cup leather in a pump piston to provide sealing means for liquid under pressure. The hollow housing portion is of relatively large size and is connected with a relatively large conduit 147 through which liquid under pressure may be introduced.

Fig. 20 shows a modified form of spring means adapted to be interposed between the cross bars 82 and the pendent frames 44 or 45 in the same manner as the springs 84 of Figs. 1 to 5. The spring means shown in Fig. 20 consist of a strong and heavy outer spring 148 and a weaker inner spring 149 of smaller diameter and greater length than the outer spring 148 positioned within the outer spring. When the two pendent frames are in close proximity or are in contact with each other they are supported by the weaker springs 149 only and even if the two filter belts operate in contact with each other the pressure of the weaker springs 149 will not be enough to damage these filter belts. As soon as the pendent frames begin to move apart due to the presence of solid matter between them the stronger springs 148 are brought into use and offer the necessary amount of resistance for efficient filtering operation.

Fig. 21 shows another modified form of spring means adapted to be interposed between a cross bar 82 and a filter belt supporting frame 44 or 45. Two flanged fittings 151 and 152 are provided at the opposite ends of a large strong spring 150 with the ends of the spring pressing against the flanges of the fittings. A bolt 153 has a head portion movably disposed in the fitting 151. The end portion of said bolt 153 is threaded into the fitting 152 so that the bolt limits the expansion of the spring. The bolt 153 is adjusted so that it will stop the expansion of the spring just before the two filter belt supporting frames make contact thus preventing injury to the filter belts when no solid material is between the filter belts. The bolt, being slidable in the fitting 151, will not interfere with the operation of the spring 150 within its normal zone of movement but will act as a stop means to limit the expansion of said spring and prevent injury to the filter belts.

Fig. 22 shows an automatic means for controlling the feed of material into the hopper of a combined press and filter press of this type. In said Fig. 22 numeral 154 designates a hopper through which material is fed to the press. A material conveyor 155 driven by a motor 156 is positioned to deliver material into hopper 154. A belt 157 operable on belt pulleys 158 and 159 may serve as a driving connection between the motor 156 and conveyor 155. A plate or trip member 160 is positioned within the hopper 154 adjacent one side thereof and is fulcrumed on a pivot 161. A switch lever 162 is rigidly connected with the plate member 160 and oscillates about pivot 161. Gravity acting on the switch lever 162 and on a weight 163 tends to move the outer end portion of the switch lever downwardly and tends to move the plate member 160 away from the wall of the hopper. An electric contact member 164 on the switch lever 162 is movable into and out of contact with a fixed contact member 165 to open and close an electric circuit through wires 166 to the motor 156. When material in the hopper 154 is below the level of the lower end portion of plate 160 gravity will close the circuit to the motor 156 and the conveyor 155 will be operated. When material piles up against the plate 160 it will move the plate 160 toward the wall of the hopper 154, lift the outer end portion of switch lever 162, break the circuit to motor 156 and stop the conveyor 155. This prevents overflow of the hopper.

Figs. 23 and 24 illustrate somewhat diagrammatically a combined press and filter press of this type adapted for operation in a generally horizontal position. When the press is designed for horizontal operation the slats of the slat belts are constructed as shown in Fig. 24 and the press is positioned so that the two slat belts are disposed alongside of each other with the slats of the belts in a generally upright position so that they will discharge a cake of solid material on its edge. In this connection it is to be noted that the press will operate in almost any inclined position in which it may be placed and may be positioned as shown in Fig. 25, so that the discharge of solid matter is at the upper end portion of the press. The slats 167, shown in section in Fig. 24, and diagrammatically in Fig. 23, have liquid deflector members 168 which extend crosswise of said slats and are inclined downwardly to direct liquid away from the foraminous slat faces 169 and toward the rear of the slats. Liquid discharge openings 168' are provided in the back portions of the slats 167. In this type of machine the slat faces may be constructed so as to constitute the filtering members. Side wings 170 are shown on one of the slat belts in Fig. 24. Frame means 174' supports the belts formed by slats 174 for movement. A hopper 171 is shown in Fig. 23 as a means of feeding this machine, said hopper having a discharge chute 172 positioned to deliver material between the two slat belts of the machine. Obviously a pluglike closing member with pressure feed which operates in the manner of the pluglike closing member shown in Fig. 19 may be employed instead of the hopper 17. Fig. 25 shows a machine of this type disposed in a position to discharge the cake upwardly. The inlet of material is at the lower end portion of the machine and the discharge of solid matter is at the upper end portion. In Fig. 25 numerals 173 and 174 indicate diagrammatically two slat and filter belts movable in the directions indicated by the arrows, and 175 indicates a pluglike closing member which may be of the character of the pluglike member shown and described in connection with Fig. 19, positioned between the lower end portions of the belts 173 and 174 and having a material inlet pipe 176 connected therewith. Positioning the machine so that the discharge of solid matter is above the level at which the material is introduced helps to prevent reabsorption of liquid by the solid matter near the point of discharge of the solid matter because all liquid will tend to drain downwardly by gravity and will be completely removed from the discharging solid matter. A transverse screw conveyor 175' may be provided at the upper end or belts 173—174 to discharge solid material.

Fig. 26 illustrates another continuous pressure separating device of the same general type as the machine shown in Fig. 25 and in which the direction of movement of the solid material is upwardly and the discharge of the cake of solid material is at the upper end portion of the machine. In Fig. 26 two endless traveling slat belts 390 and 391 are operatively disposed on sprocket wheels 392 and 393 positioned at the upper end portion of the machine and slat belt guides 394 and 395 positioned at the lower end portion of the machine. Tracks 396 and 397 supported by springs 398 which bear against cross bars 400 support the slat belts throughout the pressure area. Preferably the cross bars 400 are connected at the sides of the machine by transverse tie rods, not shown, which correspond to the tie rods 76 shown in Figs. 1 to 5. Also preferably the frame 396 is held stationary and the frame 397 is pivoted on a pivot member 401 and is swingingly movable toward and away from the frame 396. Two endless filter belts 402 and 403 are provided. The filter belt 402 passes around the slat belt 390 and over guide rolls 404, said filter belt passing through the pressure chamber 405 in contact with slat belt 390. The filter belt 403 is longer than the filter belt 402 and passes around the same slat belt 390 and around the shorter filter belt 402 and passes through the pressure chamber 405 in operative filtering engagement with the slat belt 391. Also said longer filter belt passes over guide rollers 406 and outside of a discharge hopper 407 and outside of and around a combined feed hopper 408 and feed chute 409. The material being filtered is disposed between and maintains the belts 402 and 403 in spaced relation after they leave pressure chamber 405 and until they reach upper rolls 404 and 406. The feed chute 409 is curved on its bottom portion and forms a guide over which the outer filter belt 403 may slide. A driven feed screw 410 is provided in the feed hopper 408 and feed chute 409 to feed material through the feed chute into the press. The discharge end of feed chute 490 preferably has a sealing member 411 thereon to maintain sealing engagement with the filter belts. This device is designed to handle material which is coarse enough and has enough solid matter therein so that it can be fed with a feed screw. Where the material is of such thin consistency that the screw conveyor is not practical, then fluid pressure feed means is used in connection with plug means means of the form shown in Fig. 25. The discharge hopper 407 has a driven conveyor screw 412 in the lower portion thereof to discharge material. Two driven rotary brushes 413 and 414 are positioned just above the discharge hopper and in contact with the filter belts 402 and 403 to brush the discharging solid material off of said belts. The rotary brushes 413 and 414 are driven in the directions indicated by the arrows. Any suitable driving means, not shown, may be connected with brushes 413 and 414 and conveyor screws 410 and 412. Any suitable driving means is connected with the sprocket wheels 392 and 393 at the upper ends of the slat belts 390 and 391 for driving said slat belts.

The apparatus shown in Fig. 26 is adapted for feeding material that can be fed with a screw conveyor whereas the apparatus shown in Fig. 25 is adapted for feeding material that has to be pumped or fed by liquid pressure. In both Fig. 25 and Fig. 26 the solid material is fed in a generally upward direction, the solids are discharged at the upper portion of the machine and the liquids discharged downwardly through liquid discharge means of the form shown and described in connection with Figs. 1 to 11. This reduces to a minimum the danger of liquid coming in contact with and being re-absorbed by the cake of solid material after such liquid has once been expressed therefrom, since the force of gravity is at all times operating to remove the filtrate from the vicinity of the cake.

In connection with the device shown in Fig. 26, where both belts extend around one side portion of the machine, the removal of the cake is facilitated as it is removed from the discharge between the two filter belts which thereby provide a conveyor means for the cake.

Having one frame 396 fixed, as shown in Fig. 26, simplifies the provision of the feed and discharge mechanism for the reason that no provision is necessary for taking care of variations due to movement of the frame, the movement all being confined to the opposing frame 397 which may be entirely free, or for the most part independent of the feeding and discharge mechanism.

The frame 396 may be a portion of the main supporting frame of the machine and the frame 397 may be supported from an extension 415 of the main frame 396 as shown by dotted lines.

Figs. 27 and 28 show the lower end portion of a combined press and filter press which is similar to the machine shown in Figs. 1 to 7 but is provided with means for collecting and taking care of liquid which discharges from the ends of the slat wings. Also additional stationary frame means is shown in Fig. 27 and one of the pendent frames is fixedly secured to this stationary frame means. Also resilient filter belt supporting means is shown in Fig. 27. Referring to Figs. 27 and 28, numeral 207 designates a stationary frame, 208 a fixed filter and slat belt supporting frame carrying slat belt 209 and filter belt 210 and secured by a cross member 211 to the stationary frame. 212 is a movable belt supporting frame carrying a slat belt 213 and a filter belt 214. The slat belt 213 has slat wings 215 thereon. The slat belts, filter belts, and belt supporting frames of Fig. 27 may be identical with the corresponding parts of Figs. 1 to 7. The wings 215 have a downward slope and it has been found that some liquid will discharge from the outer end portions of these wings, especially at the location where said wings pass around the sprocket wheels at the lower end of the machine. Unless this discharging liquid is taken care of it is liable to come in contact with the discharging cake of solid material and be re-absorbed back into this cake. To take care of this liquid which discharges from the end portions of the slat wings I provide on each side of the machine, see Fig. 28, a pan or trough 216 which is curved to conform to the path of travel of the ends of the slat wings and is positioned close to the slat wings so as to catch the liquid which discharges therefrom. The inner side of each trough member 216 is thin and has a sharp edge 217, see Fig. 28, and is positioned flush with the inner face of the slat so that it will be as close as possible to the discharging cake and will prevent the discharging liquid from contacting the cake. The troughs 216 are supported by brackets 218 which are secured to the movable frame 212 and move with said frame. A pan 219 is also supported by brackets 218 and the troughs 216 are positioned to discharge into the pan 219. Obviously the troughs 216 and pan 219 will swing with the movable frame 212 and will always be in the proper position to receive liquid irrespective of movement of the frame. The filter belt 214 on the movable frame 212 is guided over a roller 220 which is resiliently supported by spring means 221 so that proper tension is always maintained on this filter belt irrespective of swinging movement of the movable frame 212.

Fig. 29 shows a construction in which endless moving side belts are provided for maintaining liquid tight contact with filter belts which are drawn around the edges of slat belts. These slat belts are similar to the slat belts disclosed in the preceding figures and hereinbefore described, except that the ends of the slats of the slat belts shown in Fig. 29 are knurled and said slats do not have any slat wings on the ends thereof. In Fig. 29 I show an endless traveling slat belt 222 having rollers 223 on the back portion thereof. The rollers 223 run on track members 224. The track members 224 are each resiliently supported by spring pressed supports 225 that are slidable in threaded fittings 226 and are urged toward the track members 224 by compression springs 227. The springs 227 yieldingly and resiliently support each track member 224 and the pressure of each spring 227 may be varied by adjustment of the threaded fitting 226 connected therewith. The fittings 226 are threaded through fixed frame bars 230 of channel shaped cross section which are positioned at the sides of the machine. The slat belts 222 support endless belts 228 of impervious material, such as sheet metal, and the impervious belts 228 have the sides thereof toward the filter chamber coated with a packing or sealing material 229, such as rubber or rubber composition. The slats 231 of two main slat belts are shown in operative relation to the side belts 222—228—229 in Fig. 29. These slats are similar to the slats shown in Figs. 1 to 11, except that the slat wings are omitted and the ends of the slats 231 are provided with knurled portions 232, best shown in Fig. 30. Two filter belts 233 are supported by the main slats 231 which extend around the ends of said main slats and bear against the facings 229 of the side belts. As the filter chamber, such as chamber 58 of Fig. 2, converges toward the discharge end it is evident that some movement must occur between the ends of slats 231 and the surfaces 229. If the ends of the slats 231 are not knurled there is danger of the filter belts 233 slipping on the ends of the slats 231 and this is liable to stretch and tear the filter belts. By knurling the ends of the slats 231 I provide a surface over which the filter belts will not slide. This insures that such movement as is necessary will occur between the filter belts 233 and the surface 229 with minimum damage to the filter belts. The two roller chains 223 and adjustable track devices for the same provide supports opposite the edges of both slat belts 231 with means for adjusting pressures at all points.

Fig. 31 shows a cross section of a filter belt supporting frame in which steel bars 234 of H shape in cross section are used in place of the I beams shown in Figs. 4 to 7. The frame of Fig. 31 is otherwise similar to the frame shown in Figs. 4 to 7.

Figs. 32 to 37 disclose a modified form of the invention in which the filter belts are dispensed with and foraminous filtering faces are provided on the slats. This machine is well adapted for extracting liquid from fibrous materials containing much solid material. These figures show somewhat diagrammatically, two slat belts 262 and 263 operatively mounted in substantially the same manner as the slat belts shown in Figs. 1 to 11 to form therebetween a pressure chamber 264. Channel bars 265 positioned at the sides of the slat belts 262 and 263 in close proximity to the ends of the slats of said slat belts, as shown in Fig. 37, serve to close the sides of this pressure chamber. A hopper 266 similar to the hopper shown in Figs. 1, 2, 3, and 12 is fragmentarily shown by dot and dash lines in Fig. 32 and may serve as a means for feeding material into the pressure chamber 264. The channel bars 265 are preferably swingingly supported by pivots 267, see Fig. 32. The pivots 267 are connected with fixed frame means 268. Angular truss rod means 269, adjustable as by a turnbuckle 270 is connected between the frame means 268 and the lower end portions of the channel bars 265 to support the channel bars so that they may be swingingly adjusted for purposes hereinafter set forth. The pivotal mounting means and adjusting means for one channel bar 265 is shown in Fig. 32 and the pivotal mounting means and adjusting means for the other channel bar is the same. Preferably the inner surfaces of the channel bars 265 are provided with suitable metal facings 271 that are non-reactant to the material being operated on. The channel bars 265 are supported against transverse movement away from the pressure chamber 264 by cross bars 272, see Fig. 37. The cross bars 272 at opposite sides of the machine are connected by cross rods 273 so that the outward pressure against the two channel bars is counterbalanced. Nuts 274 on the cross rods provide for adjustment of the cross bars 272. Preferably springs 275 are provided on the cross rods 273 to yieldingly resist outward pressure and allow for some outward movement of the channel bars 265 in the event of excess pressure being exerted against them.

The nuts 274 limit the action of these springs 275 and prevent the pressure of these springs from being exerted to press the channel bars 265 against the ends of the slats of the moving slat belts 262 and 263. Preferably the nuts 274 on the inner side of the bar 272 against which the springs 275 bear are adjusted so that the channel members 265 will be just clear of the ends of the slats of slat belts 262 and 263 or will engage with the ends of said slats very lightly when in operation.

The slats of the slat belts 262 and 263 have foraminous faces 66, of a form more clearly shown in Fig. 8, and these slats further have foraminous filtering members 276 of fine mesh secured thereto and overlying the faces 66. Each filtering member 276 overhangs one edge of the slat to which it is secured to provide a portion 276' which overlaps the next adjacent slat back of the one it is secured to. This provides for a shingling effect as respects the joints between the slats. Except for the provision of the foraminous filtering members 276 and the omission of the slat wings, the slats of belts 262 and 263 are similar to the slat shown in Fig. 8.

To clean the foraminous filtering members 276 at the lower end of the machine after they have parted from the cake of solid material I provide two rotary brushes 277 positioned at the lower end of the machine, with one brush in contact with each slat belt 262 and 263 as shown in Fig. 32 and the brushes spaced apart far enough to permit a cake of solid material to pass downwardly therebetween. The brushes may be of wire or stiff bristles and they rotate in the direction indicated by the arrows in Fig. 32 so that they will brush and clean the foraminous filtering members 276 but will not have any tendency to bend the overlapping edge portions 276' of said foraminous filtering members in the wrong direction. The discharging cake passes downwardly between the two rotating brushes 277 into a hopper 278 and is discharged from this hopper by a transverse conveyor screw 279. The hopper 278 helps to safeguard the cake against contact with moisture after the cake has entered said hopper.

Preferably the rotary brushes 277, together with the hopper 278 and screw 279 are supported by end plates 280. One of these end plates 280 is shown in Figs. 32 and 33 and both of said end plates are shown in Fig. 34. The end plates 280 are adjustably secured to the channel bars 265 by bolts 281 operable in slots 282 and by adjusting screws 283. By loosening the nuts on bolts 281 and operating adjusting screws 283 it is possible to vertically adjust the brushes 277 to properly position them vertically relative to the slat belts 262 and 263. Transverse adjustment of said brushes is obtained by adjusting the channel bars 265 through the medium of truss rods 269 and turnbuckles 270.

Two enmeshed gearwheels 284 provide for driving the brushes 277 in opposite directions. Any suitable driving means, not shown, may be connected with a sprocket wheel 285 for driving the brush assembly. The conveyor screw 279 may be driven by a link belt 286 passing over sprocket wheels 287 and 288, one of which is on the shaft of one of the driven brushes.

The mounting means and supporting means and driving means for the slat belts shown in Figs. 32 to 37 may be similar to that shown in Figs. 1 to 7 inclusive.

Fig. 38 discloses another modification of this invention in which solid material is picked up on a moving filter belt by exerting a suction through said belt and is then subjected to pressure in one or more spaced apart continuously operating press units to expel the liquid from the solid material.

Fig. 38 discloses a frame 290 supporting two spaced apart rotatively mounted perforated drums or rolls 291 and 292. The rolls 291 and 292 are positioned on the upper portion of the frame 290. The rolls 291 and 292 have a driving connection between them whereby they are driven in opposite directions as indicated by the arrows. This driving connection is somewhat diagrammatically indicated by broken lines which show a crossed belt or link belt 293 operable on pulleys or sprocket wheels 294 and 295. The diagrammatically shown driving means for drums 291 and 292 also embodies a motor 296 acting through pulley 297, belt 298, wheels or pulleys 299 and 300 on countershaft 301, belt 302, wheels or pulleys 303 and 304 on countershaft 305, belt 306 and a wheel or pulley not shown which coincides with wheel 294. Obviously this drive may be made up of belts and pulleys or link belts and sprocket wheels. The drums 291 and 292 have perforations 307 in their peripheral walls. A vacuum pipe 308 is connected with the interior of each drum 291 and 292 whereby a suction may be exerted through the perforations 307.

Two endless filter belts 309 and 310 pass around the respective drums 291 and 292 and also pass through one or more press units positioned below the drums 291 and 292. Suitable guide rollers 311 are provided where needed for these filter belts to run on. Two pans 312 and 313 respectively are positioned underneath the drum 291 and 292 so that the lower peripheral portions of the drums are within the pans. Material to be filtered, usually in the form of liquid containing solid matter which is to be separated therefrom, is introduced into the pans. The filter belts are supported in contact with the portions of the drums which dip into the pans and the suction exerted through the belts will cause layers 314 of solid matter to collect on these belts as they move through the pans. These layers of solid matter will be brought together at the location where the belts begin to move downwardly and the solid matter will be between the belts when the belts pass through the press or presses.

The press or presses are shown somewhat diagrammatically in Fig. 38. Each press comprises two opposed slat belts 315 movable on wheel or guide means 316 and supported by frame or track means 317. The frames 317 are resiliently supported by springs 318 which rest against cross bars 319. More springs 318 are shown in the lower press member than in the upper one as the lower press is of heavier construction and is designed to provide a much higher pressure than the upper one.

The material will first pass through the upper press and for many materials will have a large percentage of the liquid expressed therefrom at a low pressure. The cake will expand somewhat between the two presses as indicated in the drawings and will then pass through the lower press where a much higher pressure will be applied and where more liquid will be expressed and the cake, in the desired condition of dryness, may be discharged over a horizontal conveyor 320. Relieving the pressure on the cake and permitting some expansion thereof is advantageous in the handling of some materials. Also it will be understood that only one press or more than two presses may be used in series with the rolls 291 and 292 if desired.

Driving means for the slat belts 315 is indicated diagrammatically by broken lines in Fig. 38. The driving means therein indicated comprises belts or link belts 321 and 322 driven from the countershafts 301 and 305 and engaging with driving wheels 323 on shafts which carry the wheels 316 over which the slat belts 315 pass.

The chief advantage of the construction shown in Fig. 38 lies in the fact that it makes possible a lighter press construction and saves in cost of construction. The first press in the series may be of light construction. This reduces the cake to a predetermined thickness in a light inexpensive press and only the final press need be of expensive construction to withstand heavy pressures. Also because the cake is already formed and partly compressed before it enters the heavy pressure press the problems of feeding this press are simplified.

It will be understood that the vacuum structure including drums 291 and 292 may be used in connection with the device shown in Fig. 25 as a device for removing a large proportion of the free water. Also it will be understood that only one press or more than two presses may be used in connection with the drums 291 and 292 with advantageous results.

Low density materials present a problem in providing efficient means for separating the liquids from the solids. In continuously separating liquids from solids it will be understood that the density of the material in the first place may be very low, and the large excess of free liquid may be best removed by exerting initially a light pressure. As some of the liquid is removed there is gradually developed in the material being operated upon between the two belts a material of increasing density so that an increasing pressure is required in order to separate the material under conditions of maximum efficiency.

The capacity of the machine will thus be greatly improved by providing a predetermined rate of change of pressure and this will be individual or characteristic of the particular material being treated, no two materials being exactly the same.

For failure to take into consideration these inherent features or characteristics of material there has been, in the devices and methods heretofore provided for separating liquids and solids, great inefficiency, and realization of only a portion of the maximum possible capacity of the device. All of which has resulted in increasing cost of treatment. Provision for these factors has been made in the device embodying my invention by providing for varying the rate of curvature, thereby varying the pressure, and by initially removing a large proportion of the free liquid.

I claim:

1. A continuous pressure separating device comprising a relatively long pressure chamber having a moving slat belt forming a wall thereof; material inlet means positioned to direct material to be treated in said pressure chamber; and a relatively long stationary track member having a section which is substantially a circular segment extending throughout the pressure zone of said chamber and supporting said slat belt for traveling movement and maintaining a substantially constant angular relation between the slats of said slat belt during their travel through the pressure zone, whereby damage of said slat belt by relative angular movement of the slats thereof is avoided.

2. A continuous pressure separating device comprising a relatively long pressure chamber having a moving slat belt forming a wall thereof; material inlet means positioned to direct material to be treated into said pressure chamber; a pliable filter belt supported on said slat belt; and a relatively long stationary track member having a section which is substantially a circular segment extending throughout the pressure zone of said chamber and supporting said slat belt for traveling movement and maintaining a substantially constant angular relation between the slats of said slat belt during their travel through the pressure zone, whereby damage of said filter belt by relative angular movement of the slats of said slat belt is avoided.

3. A continuous pressure separating device comprising a relatively long pressure chamber having two moving slat belts forming two walls thereof which chamber has a convergent portion, a location of maximum compression and a divergent portion; material inlet means positioned to direct material to be treated into said pressure chamber; and relatively long stationary track means supporting each of said slat belts for traveling movement, each of said track means having a curved section which is substantially a circular segment extending in both directions from said location of maximum compression and defining a pressure zone which extends in both directions from said location of maximum compression and maintaining a substantially constant angular relation between the slats of said slat belts during their travel through the pressure zone.

4. A continuous pressure separating device comprising a relatively long pressure chamber having two moving slat belts forming two walls thereof which chamber has a convergent portion, a location of maximum compression and a divergent portion; material inlet means positioned to direct material to be treated into said pressure chamber; two pliable filter belts supported on said slat belts; and relatively long stationary track means supporting each of said slat belts for traveling movement, each of said track means, having a curved section which is substantially a circular segment extending in both directions from said location of maximum compression and defining a pressure zone which extends in both directions from said location of maximum compression and maintaining a substantially constant angular relation between the slats of said slat belts during their travel through the pressure zone whereby strain on said filter belts incident to angular movement of the slats of said slat belts in the pressure zone is avoided.

5. A continuous pressure separating device comprising a convergent relatively long pressure chamber having a moving slot belt forming a wall thereof; material inlet means positioned to direct material to be treated into said pressure chamber; a relatively long stationary track member having a section which is substantially a circular segment supporting said slat belt for traveling movement in a position to obtain a predetermined compression ratio and a predetermined point of maximum compression in said pressure chamber; and means removably supporting said track member whereby it may be readily removed and replaced by another track member having a similarly positioned circular segment of different face curvature to provide a different compression ratio in said pressure chamber and at the same time without changing the point of maximum compression, thereby maintaining the structural effectiveness of the device.

6. A continuous pressure separating device comprising a filter chamber having two oppositely disposed belt means; material inlet means positioned to direct material to be treated into said filter chamber; two belt supporting frames supported for relative movement toward and away from each other; a driving shaft for each of said belt means positioned near the lower end portions of said frames; wheels on said shafts engaging said belt means; a sprocket wheel on each end portion of each shaft; two other shafts above said driving shafts; a sprocket pinion on each end portion of said other shafts; an enmeshed spur gear wheel on each end portion of said other shafts; a link belt at each side of the machine operatively connecting said sprocket wheels and said sprocket pinions; a countershaft; a pinion on each end portion of said countershaft meshed with said spur gear wheels; a driven shaft; prime mover means for said driven shaft; a pinion on each end portion of said driven shaft and a gearwheel on each end portion of said countershaft meshing with said last named pinions whereby is provided efficient means for driving said belt means at uniform speed and permitting relative swinging movement of said frames by a driving mechanism characterized by having the driving forces balanced which permits relative lightness of structure.

7. A continuous pressure separating device comprising a pressure chamber having a moving slat belt forming a wall thereof; a feed hopper positioned to direct material into said pressure chamber, said feed hopper having a foraminous wall portion; and a filter belt passing through said hopper over said foraminous wall portion and into said pressure chamber whereby free liquid is removed by gravity through said filter belt prior to the entrance of the material into the filter chamber.

8. A continuous pressure separating device comprising a pressure chamber having a moving slat belt forming a wall thereof; a feed hopper positioned to direct material into said pressure chamber, said feed hopper having a foraminous wall portion; means for exerting a suction outwardly through said foraminous wall portion; and a filter belt passing through said hopper over said foraminous wall portion and into said pressure chamber.

9. A continuous pressure separating device comprising a pressure chamber having two moving slat belts forming two opposed walls thereof; a feed hopper positioned to direct material into said pressure chamber between said moving slat belts, said feed hopper having foraminous wall portions; means for exerting a suction outwardly through said foraminous wall portions; and filter belts passing through said hopper over said foraminous wall portions and into said pressure chamber, whereby the movement of said filter belts through said hopper will promote the feed of solid material into said pressure chamber and the suction through said filter belts will withdraw a substantial amount of free liquid from the material before the material enters the pressure chamber.

10. A continuous pressure separating device comprising a pressure chamber having a moving slat belt forming a wall thereof; a feed hopper positioned to direct material into said pressure chamber, said feed hopper having a foraminous wall section; means for exerting a suction outwardly through said foraminous wall section; a filter belt passing through said hopper over said foraminous wall section and through said pressure chamber; and means for varying the area of the foraminous wall section to which the filter belt is exposed.

11. A continuous pressure separating device comprising a convergent pressure chamber having two endless traveling slat belts cooperating to form two opposed walls thereof; material inlet means positioned to direct material to be treated into said pressure chamber; means supporting said slat belts for traveling movement and for movement away from each other at the discharge end portion of the pressure chamber; slat wings connected with the end portions of the slats of one of said slat belts extending in a plane substantially at right angles to the face of said slats forming closure means at the edges of said pressure chamber and receiving therebetween the slats of the other slat belt; two filter belts supported by said slat belts and operating between the slat wings; and stationary filter belt supporting means positioned in the discharge portion of the device and between said slat wings and in relatively close spaced relation to said slats carrying said slat wings, and extending beyond the path of travel of said slat wings, whereby the filter belt and the cake of material thereon are supported for travel clear of the path of travel of said slat wings.

12. A continuous pressure separating device comprising a pressure chamber having two slat belts cooperating to form two opposed walls thereof; material inlet means positioned to direct material to be treated into said pressure chamber; frame means supporting said two slat belts for relative movement toward and away from each other; end wings secured to the slats of one of said slat belts extending in a plane at substantially right angles to the face of the slats forming closure means at the edges of said pressure chamber and receiving therebetween the slats of the other slat belt; and trough means carried by the frame on which the slat belt having the wings is carried and positioned adjacent the path of travel of the ends of the slat wings to catch the liquid discharging from the ends of the slat wings, the inner side of said trough being substantially flush with the inner face of the slat wings.

13. A continuously separating device comprising a relatively long and generally upright pressure chamber having a moving perforate slat belt forming a wall thereof, said perforations in each slat extending from the pressure face and in an angular direction therefrom and downwardly and outwardly from the pressure faces of the slats when the same are exerting pressure; a substantially long and vertically positioned slat belt supporting means positioning said slat belt to provide a vertically gradually decreasing pressure chamber wherefrom filtrate will drain outwardly through said perforate slat belt throughout the substantial length of said decreasing chamber; means driving said slat belt so that the portion thereof in said pressure chamber is moving from the lower end portion to the upper end portion of said pressure chamber; and material inlet means positioned to deliver material to be treated into the lower end portion of said pressure chamber, whereby solid material will be discharged from the upper end portion of said pressure chamber and the filtrate will tend to flow downwardly and outwardly away from the discharging material.

14. A continuous pressure separating device comprising a relatively long and generally upright pressure chamber gradually decreasing in cross section, said chamber having two endless spaced apart moving slat belts forming two spaced apart, converging and opposite sides thereof; means driving oppositely disposed laps of said slat belts in a generally upward direction in forming said pressure chamber; two spaced and concentrically disposed endless filter belts operatively engaging opposite slat belts in the pressure chamber, said filter belts being of different lengths and passing around one of said slat belts with their return portions positioned at the same side of the machine; material inlet means positioned to supply material between said spaced filter belts adjacent the inlet end portion of said pressure chamber; and discharge means positioned between said filter belts to receive material discharging from said pressure chamber whereby said two filter belts will guide the discharging solid material.

15. A continuous pressure separating device comprising a relatively long and generally upright pressure chamber gradually decreasing in cross section, said chamber having two endless spaced apart moving slat belts forming two spaced apart, converging and opposite sides thereof; means driving oppositely disposed laps of said slat belts in a generally upward direction in forming said pressure chamber; two spaced and concentrically disposed endless filter belts passing around one of said slat belts and operatively engaging opposite slat belts in the pressure chamber, one of said filter belts being longer than the other; guide rollers for said two filter belts supporting said two filter belts in spaced apart relation external to said pressure chamber and with their return portions positioned at the same side of the machine; material feeding means positioned between said filter belts at the intake end portion of said pressure chamber; and discharge means positioned between said two filter belts to receive material discharging from said pressure chamber, whereby said two filter belts will guide discharging solid material to said discharge means.

16. A continuous filtering device comprising a relatively long and generally upright pressure chamber having a moving perforate slat belt forming one wall thereof; a substantially long and vertically positioned arcuate shaped supporting means positioning said slat belt, one portion of said supporting means positioning the slat belt to provide a vertically gradually decreasing pressure chamber portion and the other portion of said supporting means positioning the slat belt to provide a gradually increasing pressure chamber portion, whereby is provided a decreasing portion with increasing pressure and outward discharge of filtrate and also an increasing discharge portion with decrease of pressure and no discharge of filtrate; means driving said slat belt so that the portion thereof in said pressure chamber is moving from the lower end portion to the upper end portion of said pressure chamber; and material inlet means positioned to deliver material to be treated into the lower end portion of said pressure chamber, whereby solid material will be discharged from the upper end portion of said pressure chamber and the filtrate will tend to flow outwardly away from the discharging material while it is in the pressure chamber and filtrate will not be available to be drawn into the discharging material when the discharging material is in the discharge portion and is expanding and is absorbent.

ROBERT M. THOMPSON.